(12) United States Patent
Kraus et al.

(10) Patent No.: US 11,003,766 B2
(45) Date of Patent: May 11, 2021

(54) ENHANCING CYBERSECURITY AND OPERATIONAL MONITORING WITH ALERT CONFIDENCE ASSIGNMENTS

(71) Applicant: Microsoft Technology Licensing, LLC, Redmond, WA (US)

(72) Inventors: Naama Kraus, Haifa (IL); Roy Levin, Haifa (IL); Assaf Israel, Ganei Tikva (IL); Oran Brill, Modiin (IL); Yotam Livny, Gadera (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 16/105,500

(22) Filed: Aug. 20, 2018

(65) Prior Publication Data
US 2020/0057850 A1 Feb. 20, 2020

(51) Int. Cl.
*H04L 29/06* (2006.01)
*G06F 21/55* (2013.01)
*G06N 3/08* (2006.01)
*G06F 21/56* (2013.01)

(52) U.S. Cl.
CPC .......... *G06F 21/552* (2013.01); *G06N 3/08* (2013.01); *G06F 21/561* (2013.01); *G06F 2221/034* (2013.01)

(58) Field of Classification Search
CPC .......... G06F 21/552; G06F 21/561; G06F 2221/034; G06N 20/10; G06N 20/20; G06N 3/0454; G06N 3/08; G06N 7/005; G06N 3/04; G06N 3/0445; H04L 63/14; H04L 63/1416; G06K 9/00711; G06K 9/00718; G06K 9/00744; G06K 9/4604; G06K 9/4628; G06K 9/6293; G06K 9/66
See application file for complete search history.

(56) References Cited

U.S. PATENT DOCUMENTS 6,154,844 A 11/2000 Touboul et al.
9,479,518 B1 10/2016 Fang et al.
9,690,937 B1 6/2017 Duchin et al.
(Continued)

OTHER PUBLICATIONS

"Classifier with variable number of features", retrieved from <<https://stats.stackexchange.com/questions/145771/classifier-with-variable-number-of-features>>, Apr. 11, 2015, 1 page.
(Continued)

*Primary Examiner* — Hosuk Song
(74) *Attorney, Agent, or Firm* — Ogilvie Law Firm

(57) ABSTRACT

Tools and techniques are described to automate triage of security and operational alerts. Insight instances extracted from raw event data associated with an alert are aggregated, vectorized, and assigned confidence scores through classification based on machine learning. Confidence scoring enables heavily loaded administrators and controls to focus attention and resources where they are most likely to protect or improve the functionality of a monitored system. Feature vectors receive a broad base in the underlying instance values through aggregation, even when the number of instance values is unknown prior to receipt of the event data. Visibility into the confidence scoring process may be provided, to allow tuning or inform further training of a classifier model. Performance metrics are defined, and production level performance may be achieved.

20 Claims, 7 Drawing Sheets

(56) References Cited

U.S. PATENT DOCUMENTS

| | | | |
|---|---|---|---|
| 10,007,786 B1* | 6/2018 | Bhatkar | G06N 20/00 |
| 10,277,628 B1* | 4/2019 | Jakobsson | H04L 51/00 |
| 2004/0128615 A1 | 7/2004 | Carmel et al. | |
| 2006/0048106 A1 | 3/2006 | Citron et al. | |
| 2007/0027873 A1 | 2/2007 | Factor et al. | |
| 2007/0265999 A1 | 11/2007 | Amitay et al. | |
| 2007/0294187 A1* | 12/2007 | Scherrer | G06Q 20/401 |
| | | | 705/75 |
| 2008/0141233 A1 | 6/2008 | Gurevich et al. | |
| 2008/0313496 A1 | 12/2008 | Prabhakaran et al. | |
| 2009/0055813 A1 | 2/2009 | Haber et al. | |
| 2009/0319484 A1 | 12/2009 | Golbandi et al. | |
| 2011/0131202 A1 | 6/2011 | Cohen et al. | |
| 2011/0145380 A1 | 6/2011 | Glikson et al. | |
| 2012/0072983 A1 | 3/2012 | Mccusker et al. | |
| 2012/0137285 A1 | 5/2012 | Glikson et al. | |
| 2012/0311708 A1* | 12/2012 | Agarwal | G06F 21/566 |
| | | | 726/24 |
| 2012/0327125 A1 | 12/2012 | Kutliroff et al. | |
| 2014/0232631 A1 | 8/2014 | Fleischmann et al. | |
| 2015/0178626 A1* | 6/2015 | Pielot | G06N 20/00 |
| | | | 706/12 |
| 2015/0261649 A1 | 9/2015 | Boehm et al. | |
| 2015/0263999 A1 | 9/2015 | Levin et al. | |
| 2015/0363863 A1 | 12/2015 | Jurgenson et al. | |
| 2016/0063071 A1 | 3/2016 | Guy et al. | |
| 2016/0110913 A1 | 4/2016 | Kosoy et al. | |
| 2016/0188711 A1* | 6/2016 | Levin | G06F 16/353 |
| | | | 707/740 |
| 2016/0217392 A1* | 7/2016 | Hashavit | G06F 17/16 |
| 2016/0335435 A1* | 11/2016 | Schmidtler | G06F 21/562 |
| 2017/0068746 A1 | 3/2017 | Levin et al. | |
| 2017/0085588 A1 | 3/2017 | Laidlaw et al. | |
| 2017/0220945 A1 | 8/2017 | Barger et al. | |
| 2017/0228418 A1 | 8/2017 | Levin et al. | |
| 2017/0316312 A1* | 11/2017 | Goyal | G06F 7/48 |
| 2017/0323463 A1 | 11/2017 | Leiba et al. | |
| 2018/0004948 A1 | 1/2018 | Martin et al. | |
| 2018/0007208 A1 | 1/2018 | Ohayon et al. | |
| 2018/0032846 A1* | 2/2018 | Yang | G06K 9/4604 |
| 2018/0069893 A1* | 3/2018 | Amit | H04L 63/1416 |
| 2018/0152465 A1 | 5/2018 | Levin et al. | |
| 2018/0165548 A1* | 6/2018 | Wang | G06N 3/0454 |
| 2018/0189296 A1 | 7/2018 | Ashour et al. | |
| 2019/0102695 A1* | 4/2019 | Biswas | G06F 13/102 |
| 2019/0171816 A1* | 6/2019 | Copty | G06F 21/566 |
| 2019/0205606 A1* | 7/2019 | Zhou | G06N 3/0445 |
| 2019/0340541 A1* | 11/2019 | Watson | G06N 3/084 |
| 2019/0378010 A1* | 12/2019 | Morris | G06Q 20/4016 |
| 2019/0378051 A1* | 12/2019 | Widmann | G06Q 30/0185 |
| 2020/0003678 A1* | 1/2020 | Wolf | B82Y 40/00 |
| 2020/0067861 A1* | 2/2020 | Leddy | G06F 21/6245 |

OTHER PUBLICATIONS

"Dealing with datasets with a variable number of features", retrieved from <<https://stats.stackexchange.com/questions/23456/dealing-with-datasets-with-a-variable-number-of-features>>, Feb. 11, 2012, 4 pages.

"Dimensionality reduction", retrieved from <<https://en.wikipedia.org/wiki/Dimensionality_reduction>>, Jun. 19, 2018, 7 pages.

"Evaluation of binary classifiers", retrieved from <<https://en.wikipedia.org/wiki/Evaluation_of_binary_classifiers>>, May 26, 2018, 6 pages.

"Evaluation measures (information retrieval)", retrieved from <<https://en.wikipedia.org/wiki/Evaluation_measures_(information_retrieval)>>, Jun. 23, 2018, 8 pages.

"Logistic regression", retrieved from <<https://en.wikipedia.org/wiki/Logistic_regression>>, Jul. 10, 2018, 15 pages.

"Machine Learning Server Overview", retrieved from <<https://www.microsoft.com/en-us/sql-server/machinelearningserver>>, no later than Mar. 2, 2018, 7 pages.

"Machine Learning Textbook", retrieved from <<http://www.cs.cmu.edu/~tom/mlbook.html>>, 1997, 1 page.

Ajay Modi, "CSM Automated Confidence Score Measurement of Threat Indicators", retrieved from <<https://repository.asu.edu/attachments/189583/content/Modi_asu_0010N_17172.pdf>>, Aug. 2017, 91 pages.

"Use Aggregate Functions", retrieved from <<https://docs.microsoft.com/en-us/sql/analysis-services/multidimensional-models/use-aggregate-functions?view=sql-server-2017>>, no later than Jul. 13, 2018, 5 pages.

"Processing data with different number of features", retrieved from <<https://stats.stackexchange.com/questions/236307/processing-data-with-different-number-of-features>>, Sep. 22, 2016, 2 pages.

"Standard score", retrieved from <<https://en.wikipedia.org/wiki/Standard_score>>, May 28, 2018, 7 pages.

"Supervised learning", retrieved from <<https://en.wikipedia.org/wiki/Supervised_learning>>, Feb. 18, 8 pages.

"Top 10-2017 A10-Insufficient Logging&Monitoring", retrieved from <<https://www.owasp.org/index.php/Top_10-2017_A10-Insufficient_Logging%26Monitoring>>, Jan. 1, 2018, 3 pages.

"Training a regression algorithm with a variable number of features", retrieved from <<https://datascience.stackexchange.com/questions/32817/training-a-regression-algorithm-with-a-variable-number-of-features?rq=1>>, Jun. 8, 2018, 3 pages.

Nigel Williams, et al., "Evaluating Machine Learning Methods for Online Game Traffic Identification", retrieved from <<https://pdfs.semanticscholar.org/0b52/b945627aa8471ff9d46dc1c0974edec90e38.pdf>>, Mar. 2006, 17 pages.

"International Search Report and Written Opinion Issued in PCT Application No. PCT/US19/39661", dated Oct. 1, 2019, 26 Pages.

\* cited by examiner

ENHANCING CYBERSECURITY AND OPERATIONAL MONITORING WITH ALERT CONFIDENCE ASSIGNMENTS

BACKGROUND

Cybersecurity tries to reduce or prevent attacks that damage desirable qualities of data and computing resources, such as confidentiality, availability, integrity, and privacy. Sometimes a cyberattack is focused on a particular quality, e.g., a distributed denial of service attack is typically focused on eroding or eliminating the availability of data and transactional services. At other times, an attack is directed at multiple qualities, e.g., a man-in-the-middle attack reduces confidentiality and privacy, but it may also introduce spurious or modified data, thereby attacking data integrity. Cyberattacks take many forms, including social engineering efforts such as phishing, compute-intensive attacks such as brute force attacks on passwords, open attacks such as adware and ransomware, hidden attacks such as rootkits and data leaks, attacks focused on particular resources such as computing power (creating a zombie army of bots) or storage (hijacking web server storage to hold illegal materials), attacks that target specific kinds of data (e.g., medical histories, credit card data), and many other forms of attack.

Some of these tools or techniques automatically monitor events in a computing technology system, either as the events occur or by later inspection of event logs. Some tools or techniques merely log or report events, whereas others may raise an alert in order to direct attention to particular events that are deemed suspect or otherwise deemed more important to ensure proper operation of the computing technology. The monitored events may be security-related events, or they may relate to operational health, or both. Many different kinds of events can be monitored, including for example device operation result codes, firmware-generated errors, failed or successful attempts to login, attempts to open or create or modify or delete a file, attempts to change directories, attempts to change access privileges, acts such as scanning ports, rebooting, cloning, sending or receiving network communications which fit a specified pattern, and so on.

SUMMARY

Some teachings herein were motivated by an initial technical challenge of rapidly distinguishing security alerts that indicate a substantial threat from alerts that do not. This can be viewed as a challenge to rapidly, efficiently, and effectively weed out alerts that are false positives. A subordinate challenge was how to process raw event data of a monitored computing system into a form that is suitable for useful classification by machine learning mechanisms. Other technical challenges addressed by the innovations taught here will also be apparent to one of skill from the discussion provided below.

Some alert confidence scoring embodiments include a processor, and a memory in operable communication with the processor, and other computational components such as an aggregator, a vectorizer, and a classifier. The aggregator receives insight instances. Each insight instance of interest has an insight value and an insight type, and is associated with an alert identifier which identifies an alert. The alert was generated from monitoring a monitored system. The aggregator aggregates insight values of received instances which have the same insight type. The vectorizer creates a feature vector containing feature values, with the feature values corresponding to insight types. The feature vector contains a feature value which is an aggregated insight value produced by the aggregator from multiple insight values. The feature vector is also associated with the alert. The classifier accepts the feature vector and assigns a confidence score to the alert based at least partially upon the feature vector. The confidence score indicates a degree of confidence that the alert represents a threat to one or more operations of the monitored system. An output device may be configured to report the confidence score.

Some confidence scoring embodiments provide or use particular actions. For example, an embodiment may obtain digital electronic event data which includes or otherwise identifies at least one of the following: one or more event structures generated from monitoring, an alert structure generated from monitoring, or an alert identifier which identifies an alert structure generated from monitoring. The embodiment extracts multiple insight instances from the event data, each insight instance having an insight value and an insight type, and automatically aggregates insight values of at least two insight instances which have the same insight type, thereby producing an aggregated insight value. The embodiment also automatically vectorizes insight data by creating a feature vector containing feature values. The feature values correspond to insight types, and the feature vector contains the aggregated insight value as one of the feature values. The embodiment classifies the feature vector using a machine learning driven classifier, and assigns at least one confidence score to the event data based on a result of the classifying. Each confidence score indicates a degree of confidence that the event data represents a threat to one or more operations of a monitored system. The embodiment may also configure an output device with at least one assigned confidence score, or it may make a control mechanism take action to implement a security control or an operational control.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
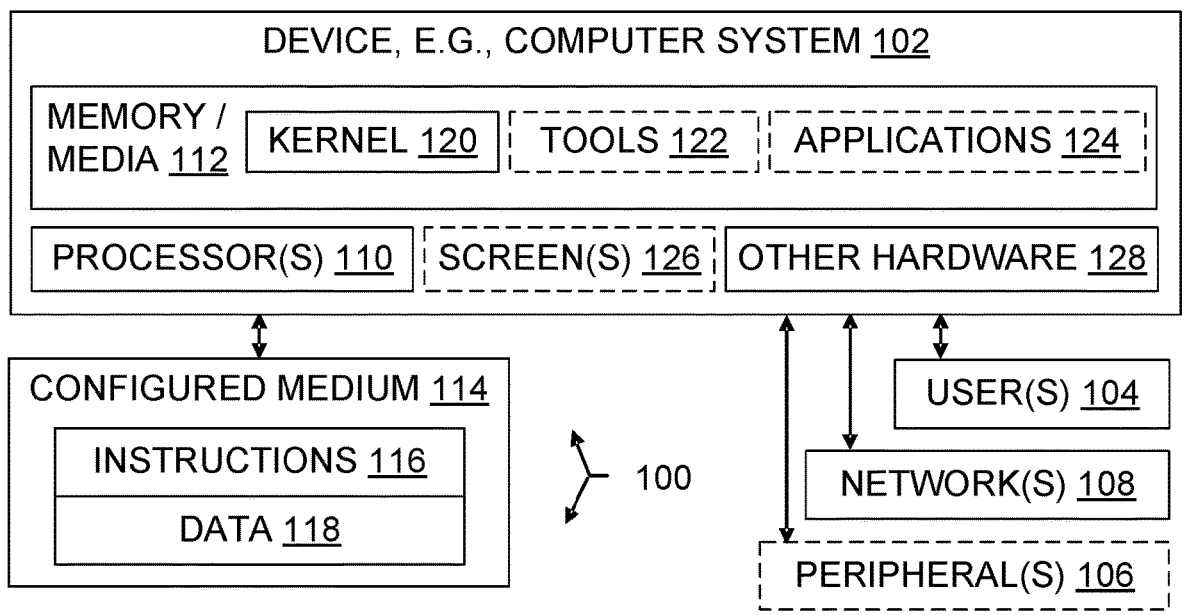
FIG. 1 is a block diagram illustrating a computer system and also illustrating a configured storage medium.

Innovations may expand beyond their origins, but understanding an innovation's origins can help one more fully appreciate the innovation. In the present case, system monitoring innovations arose in the context of the inventors seeking ways to improve system security. Computing systems are vulnerable to attacks of different types. In order to increase a system's security, organizations often track ongoing events in order to capture potential threats. As false positives are common, suspicious events are sometimes further investigated by security analysts. These analysts examine different features of a given event, and based on them, determine whether the event is malicious or not. The analysts' decision is used for triggering alerts to the system's customers.

To track ongoing events, intrusion detection systems and other security tools monitor events in individual machines, computer networks, and other computing systems. These tools may produce alerts when attention from a security administrator or a more sophisticated security tool may be worthwhile. Similarly, resource management tools monitor the use of storage, CPUs, bandwidth, process descriptors, file descriptors, ports, virtual machines, server nodes, and other resources, and produce alerts when attention from an operations administrator or a more sophisticated operations tool may be worthwhile.

The number of security alerts or operational alerts per hour generated by monitoring even a relatively small computing system may be in the hundreds, or higher. Depending on security settings, alert thresholds, the number and focus of monitoring agents, monitoring granularity, the number of active users, the number of machines and networks monitored, available event log storage space, and other factors, the number of events that are logged or otherwise noted within a given time period, e.g., an hour, may well be in the thousands or even more. In large organizations, security analysts may be flooded with many different security events, or many events on many different resources. As a result, security analysts are often not capable of analyzing the enormous number of potential security or resource threats for their organization. Accordingly, tools and techniques which productively allocate attention (e.g., the attention of a human administrator or processing cycles of an automated intrusion prevention tool) and computational resources to particular alerts may improve the efficiency and effectiveness of health or security monitoring functionality in a computing system, and directly or indirectly improve the health and security of the monitored system itself.

Some embodiments taught herein use or provide a Virtual Analyst which assigns confidence scores to security alerts. The Virtual Analyst does not assign confidence scores to alerts in the same way that human experts would assign such scores, but nonetheless produces results that are consistent with scoring that results from the analysis of human security and operations experts.

Some embodiments described herein use supervised machine learning for computing an alert's confidence score, which captures the confidence that an alert is indeed malicious or otherwise worthy of closer attention. Such confidence scoring can be highly useful to customers, as it enables prioritizing alerts for investigation. Confidence scoring may also enable filtering out alerts which have scores below a threshold parameter. Ranking a list of alerts may be crucial for efficiently utilizing a human analyst's limited time.

Given an event, some embodiments execute a procedure that follows the logic of a security expert. The procedure generates a set of insights that characterize security aspects of the event. Each insight is associated with a type and a value. For example, an insight may count the number of high severity alerts that were generated on a machine 24 hours prior to the event. The number of insight types is denoted by N, and is fixed. An alert may generate multiple instances of a particular insight type with potentially different values, and the total number of insights (instances) may vary among events.

In order to process the variable number of insight instances generated per event, some embodiments perform the following: (a) for each insight type, aggregate the values of all its instances (of the given event) using an aggregation function, (b) represent an event by an N-dimensional feature vector over the insight types, and (c) apply supervised machine learning techniques in order to compute confidence scores of alerts. The confidence scores can then be used to focus limited attention and computational resources where their application will most improve the security or operation of the monitored system.

Some embodiments described herein may be viewed by some people in a broader context. For instance, concepts such as aggregation, classification, confidence, security, and operations status may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to prioritize alerts. Other configured storage media, systems, and methods involving aggregation, classification, confidence, security, or operations status are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Embodiments address technical activities that are rooted in computing technology, potentially including a wide range of events in a monitored system. Some alert scoring embodiments improve the functioning of computing systems by helping prioritize cybersecurity control actions, or computational resource management actions, or both, so that those systems can operate more securely, efficiently, and effectively. When alerts are not scored, time and resources may be wasted by sifting in an ad hoc manner through alerts that are more informational than urgent, or by addressing alerts that are less impactful than alerts not being addressed. By operation of the alert confidence scoring mechanisms and techniques taught herein, monitored systems will be improved because high-scored security alerts and operational alerts will be given prompt attention, instead of being lost in the noise of false positives or being acted upon only hours or days after an incident or threshold crossing, instead of within minutes. The sooner a security incident is detected, classified as urgent, and acted upon, the more its adverse impact can be limited. With rapid alert scoring, an intrusion may be confined to a single machine instead of an entire subnet, for example, or data exfiltration may be terminated after one file is breached instead of revealing a thousand files.

Some of the technical effects provided by some embodiments include (a) division of alerts into those which have a high confidence score and those which do not, (b) alert feature vectors which are based on broad underlying event data through the use of instance value aggregation, and (c) a continually refined machine learning model. Corresponding technical improvements may include faster and tighter containment of security intrusions or data breaches, more advanced warning of changes to resource capacity usage, and other improvements that will be apparent to one of skill in the art.

Other aspects and advantages of the technical characteristics of the teachings will also be apparent to one of skill from the description provided.

Acronyms, Abbreviations, and Names

Some acronyms, abbreviations, and names are defined below. Others are defined elsewhere herein, or do not require definition here in order to be understood by one of skill.
ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IDS: intrusion detection system generally, may be a HIDS (host-based IDS) or a NIDS (network-based IDS), for example
IP: internet protocol
LAN: local area network
OS: operating system
RAM: random access memory
ROM: read only memory
UEFI: Unified Extensible Firmware Interface
WAN: wide area network Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private, public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as extracting insight instances from event data, aggregating insight values, vectorizing insight data, classifying feature vectors, and executing a machine learning model, are understood herein as inherently digital. A human mind cannot interface directly with a CPU or other processor, or with RAM or other digital storage, to read and write the necessary data to perform the alert confidence scoring steps taught herein. This would be well understood by persons of skill in the art in view of the present disclosure, but others may sometimes need to be informed or reminded of the facts. Unless stated otherwise, embodiments are also presumed to be capable of operating at scale (i.e., operating on event data from one hundred or more monitored devices) in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, aggregating, assigning, avoiding, classifying, commanding, comparing, computing, connecting, communicating, configuring, creating, determining, displaying, executing, extracting, identifying, indicating, listing, mapping, meeting, notifying, obtaining, providing, raising, ranking, receiving, running, sending, specifying, taking, using, utilizing, vectorizing (and accesses, accessed, aggregates, aggregated, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as computational system or computing system 104 users 106 peripherals 108 network generally, including, e.g., LANs, WANs, software defined networks, and other wired or wireless networks 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems (IDS), intrusion prevention systems (IPS), software development tools and tool suites, hardware development tools and tool suites 124 applications, e.g., word processors, web browsers, spreadsheets, games, email tools 126 display screens, also referred to as "displays"

128 computing hardware not otherwise associated with a reference number 106, 108, 110, 112, 114

202 monitored computing technology system, namely, a system or device which includes a processor and memory and is being monitored; also referred to as "monitored system"

204 monitor, e.g., hardware, software, or both which receive signals and monitor them or otherwise monitor at least one condition or status to identify one or more predefined events, and then produce event data in response to detection of the predefined events; although in theory one could distinguish between monitors and detectors on some basis, e.g., portable/fixed or active/passive, as used herein a "detector" is an example of a "monitor"

Figure 2:
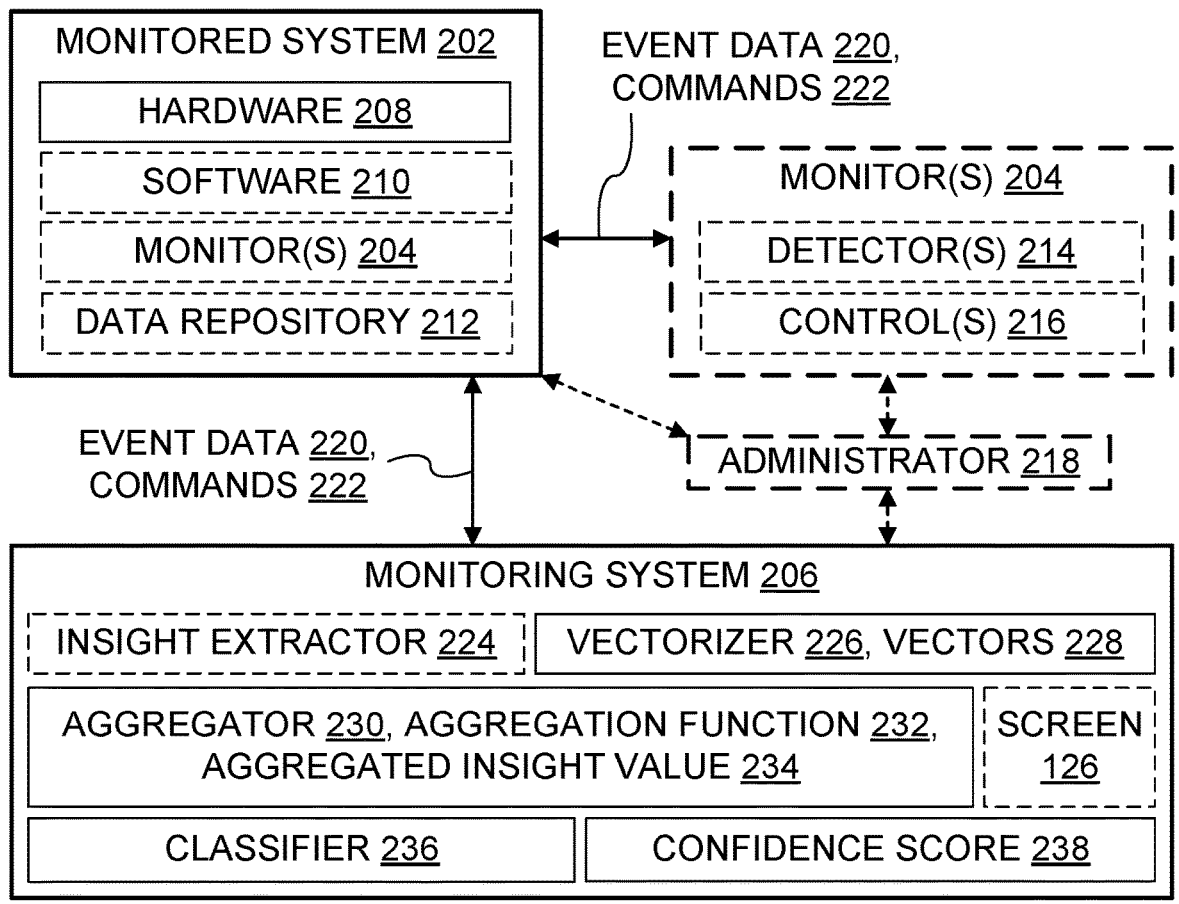
FIG. 2 is a block diagram illustrating aspects of a computing technology environment which includes a monitored system, a monitoring system, event data produced by monitoring, and other items.

206 monitoring system, namely, a system which is monitoring a monitored system using one or more monitors; although they are shown in separate boxes in FIG. 2, the monitoring system and the monitored system may be the same computing system 102 in some cases 208 hardware of the monitored system, which may include computing hardware 106, 108, 110, 112, 114, 126, 128 or a portion thereof, and may also include non-computational hardware which neither supports digital operation nor operates digitally 210 software of the monitored system, which may include software 116, 118, 120, 122, 124, for example 212 data repository, e.g., log, database, or audit trail 214 event detectors, e.g., intrusion detectors, detection portion of intrusion prevention systems, detection portion of anti-malware tools, motion detectors, temperature sensors, humidity sensors, light detectors, microphones, switches, and other devices or mechanisms which detect an event and may in response send a signal indicating said event detection; detectors 214 are examples of monitors 204

216 controls, e.g., security controls, resource management controls; security controls may include physical controls and logical controls; logical controls are sometimes referred to as "logical access controls" or "technical controls"; controls may reside in monitors or be functionally closely linked to monitors 218 administrator; may be human or a computational system 220 event data 222 commands 224 insight extractor 226 vectorizer 228 feature vector 230 aggregator 232 aggregation function; may also be referred to as "aggregate function"; accepts N inputs and returns one or more values as output, N>1

234 aggregated insight value 236 machine learning-based classifier; may also be referred to informally as the "model" with the understanding that the model is accompanied by and accessed through input and output interfaces 238 confidence score 302 event 304 event structure, i.e., data structure containing data about an event 306 event type 308 event ID, also referred to as "event identifier"

310 event characteristics generally 312 location of an event 314 user ID associated with an event 316 time, e.g., point in time or time interval associated with an event 318 data which places an event in context 320 alert 322 alert structure, i.e., data structure containing data about an alert 324 alert type 326 alert ID, also referred to as "alert identifier"

402 insight instance 404 insight value 406 insight type 502 insight ranker, also referred to as "insight instance ranker"

504 list of ranked insight instances 602 feature value; also referred to as "feature vector value"

702 trained model, e.g., model trained using machine learning to classify inputs 704 classifier interface, e.g., API or other interface which receives feature vector to classify and feeds feature vector to trained model for classification and then receives classification (confidence score) from trained model and provides it to monitoring system software for display to a user or further use in prioritizing alerts 802 sum aggregation function, namely, function which takes two or more numbers as inputs and provides their additive sum as an output 804 product aggregation function, namely, function which takes two or more numbers as inputs and provides their multiplicative product as an output 806 min aggregation function, namely, function which takes two or more numbers as inputs and provides their minimum value as an output 808 max aggregation function, namely, function which takes two or more numbers as inputs and provides their maximum value as an output 810 count aggregation function, namely, function which takes N inputs and provides N as an output, where N is an integer greater than one 812 distinct count aggregation function, namely, function which takes N inputs and provides M as an output, where M and N are integers, N>1, 1<=M<=N, and M is the number of different input values, e.g., distinct-count(1,3,7,19)=4, distinct-count(1,3,-7,19,3)=4, distinct-count(1,3,1,0.2,3)=3, and distinct-count(-3,-3,-3,-3,-3,-3,-3)=1.

814 median aggregation function, namely, function which takes two or more numbers as inputs and provides their median value as an output; to find the median of a set of N numbers, put the N numbers in order (ascending or descending, either one) and the media is the number in the middle (if N is odd) or the average of the two in the middle (if N is even)

816 mean aggregation function, namely, function which takes two or more numbers as inputs and provides their mean (arithmetic average) as an output; the mean of N numbers is their sum divided by N 818 mode aggregation function, namely, function which takes two or more numbers as inputs and provides their mode as an output; the mode of a set of numbers is the number or numbers that occur most frequently in the set, e.g., mode(1,2,3,3,4,5)=3, mode(-1,2,-3,4,2,-1)=-1, 2.

Figure 8:
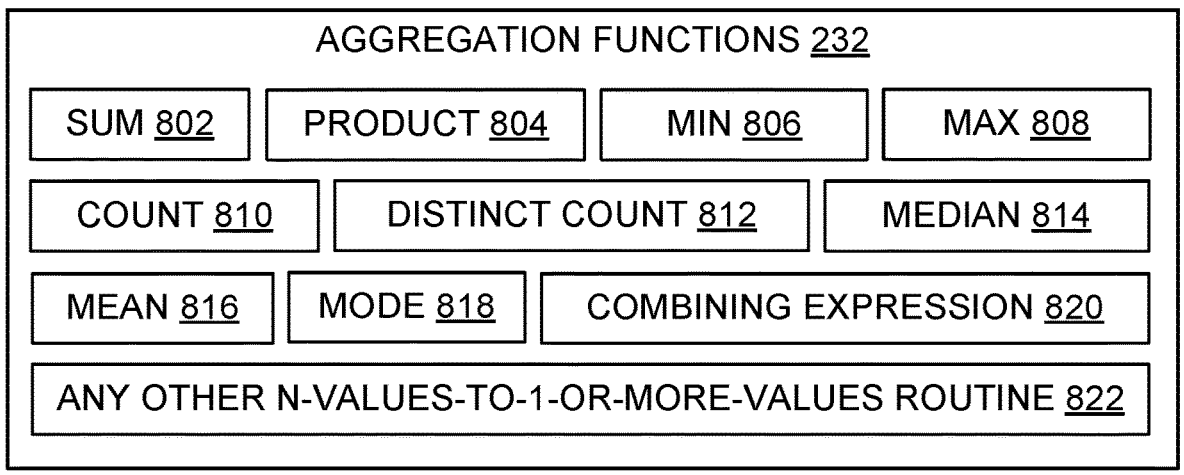
FIG. 8 is a block diagram illustrating some aggregation functions.

820 expression combining aggregation function, namely, a combination of aggregation functions which takes two or more numbers as inputs to the combination and a result of the combination as an output; the functions may be combined using any computable operators, and may include functions which are not themselves aggregation functions 822 any aggregation function not otherwise specifically called out in FIG. 8, e.g., x-percentile (the number of values below a specified percentage x of all values of interest)

Figure 10:
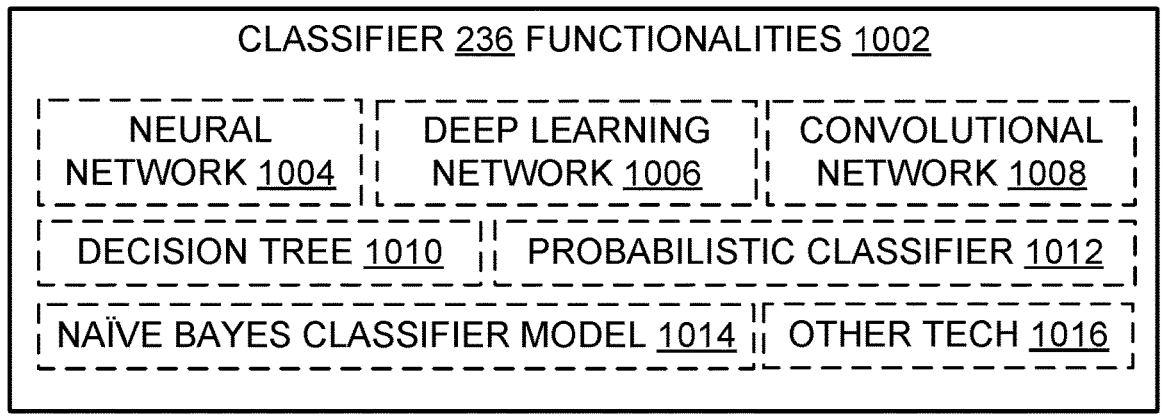
FIG. 10 is a block diagram illustrating some classifier functionalities.
Figure 11:
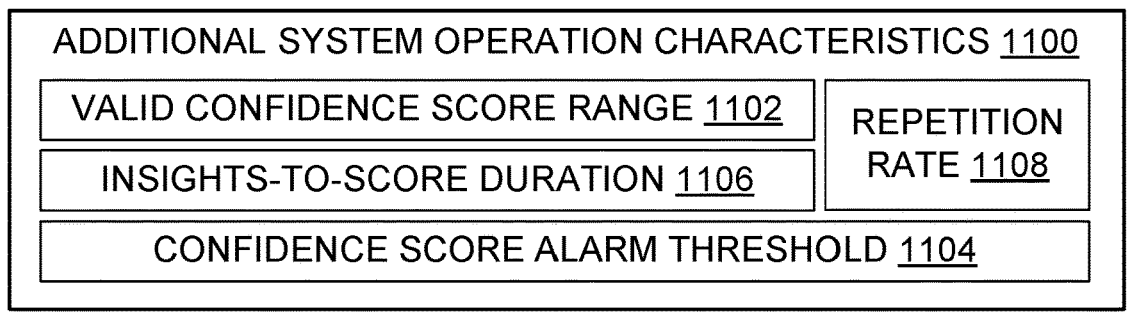
FIG. 11 is a block diagram illustrating some additional characteristics of operation in some systems.
Figure 12:
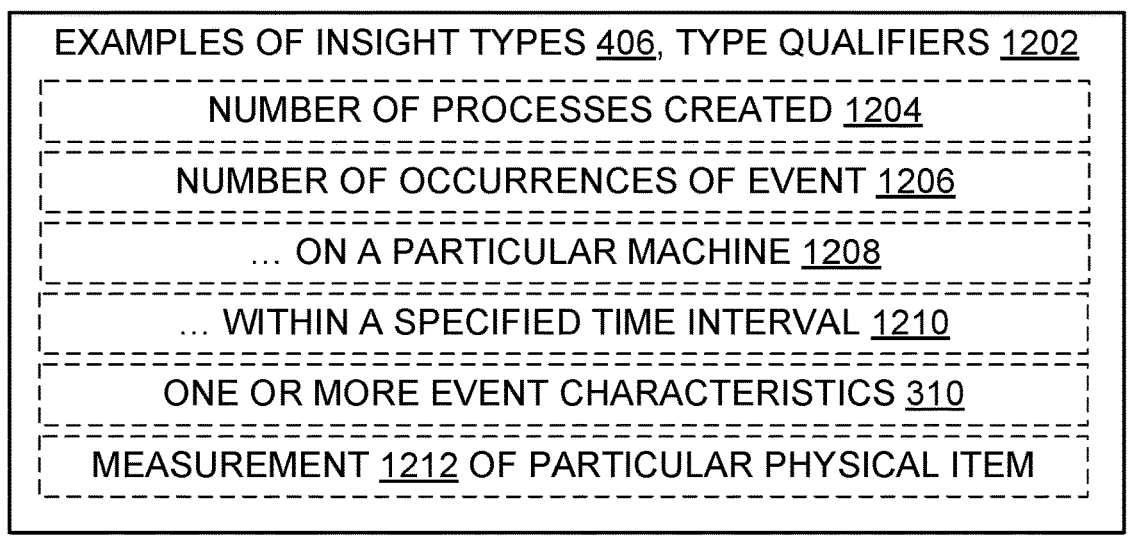
FIG. 12 is a block diagram illustrating some examples of insight types.

902 functionality which may be specifically excluded from a given embodiment 904 vector dimensionality, i.e., number of feature values in a feature vector 906 dimensionality reduction code, which upon execution reduces the number of random variables under consideration in a machine learning context 908 padding code, which upon execution inserts default values to replace undefined values when vectorizing in a machine learning context 910 default value, e.g., a value in a feature vector which is not dependent on any particular underlying event data 912 undefined value, e.g., space or slot in a feature vector for which there is no corresponding event data 1002 classifier functionalities 1004 neural network functionality 1006 deep learning network functionality 1008 convolutional network functionality 1010 decision tree functionality
1012 probabilistic classifier functionality
1014 naïve Bayes classifier model functionality
1016 other machine learning classification technologies not specifically called out in FIG. 10
1100 system operation characteristics or structures or other functionality not specifically called out in Figures outside FIG. 11
1102 confidence score range, e.g., [0.0 . . . 1.0]; values outside this range are either normalized to fit inside the range or discarded or treated as invalid, depending on the implementation
1104 confidence score alarm threshold; may be used to automatically determine whether to escalate an alert to an alarm in implementations whose hierarchy includes: unmonitored occurrences, monitored events, alerts based on monitored events, alarms based on high-confidence alerts
1106 duration from getting extracted insights to assigning a confidence score to an alert or events associated with the extracted insights; duration may be measured in system time, real-world clock time, or other units, but real-world clock time is assumed unless stated otherwise
1108 repetition rate, namely, rate at which a specified sequence of acts is repeated
1202 qualifier which helps define insight type
1204 number of processes created; this is an example insight type
1206 number of occurrences of a particular kind of event; this is an example insight type, and presumes a particular kind of event is stated
1208 insight type qualifier which helps define an insight type by limiting it to a particular machine
1210 insight type qualifier which helps define an insight type by limiting it to a particular time interval
1212 measurement of a particular physical item, e.g. data from a motion detector, or data from a switch in a burglar alarm system
1300 monitored source of event data
1302 host-based network intrusion detection system, host-based network intrusion prevention system, network-based network intrusion detection system, or network-based network intrusion prevention system; these are examples of tools 122 and also examples of detectors 214
1304 cloud management plane or network management plane, e.g., a management plane of a software-defined network
1306 antivirus tool; this is an example of a tool 122 and also an example of a detector 214
1308 motion detector; this is an example of a detector 214
1310 physical security mechanism not otherwise called out in Figures, e.g., man trap, perimeter sensor, etc.
1312 firewall; this is an example of a tool 122 and also an example of a detector 214
1314 storage controller
1316 cluster controller
1318 logical security mechanism not otherwise called out in Figures, e.g., key vault, file integrity checker, etc.
1400 alert confidence scoring method; may also assign a confidence score to a set of event data which does not contain an alert
1402 obtain event data
1404 extract insight instances
1406 aggregate insight values
1408 vectorize insight data
1410 classify a feature vector
1412 assign a confidence score to a feature vector based on classification 1410
1414 compare a confidence score to a threshold
1416 display, speak, print, or otherwise configure a screen or other output device, e.g., for reporting or visibility enhancement or other purposes
1500 usage example
1502 virtual advisor, e.g., alert confidence scoring service, module, or appliance
1504 advice consumer, namely, entity that consumes output from virtual advisor, e.g., administrator 218 or intrusion prevention system
1506 control actions, e.g., commands 222 to tools 122 or notifications or escalations to a more authoritative advice consumer
1508 definitions of insight types; may be implemented, e.g., using examples and qualifiers like those shown in FIG. 12 or otherwise taught herein
1510 human security expert
1600 flowchart
1602 notify an administrator 218
1604 take a control action
1606 command a security tool to implement a security control; this is an example of taking a control action
1608 command a computational resource management tool to implement an operational control; this is an example of taking a control action
1610 provide a user with visibility into an alert scoring process or mechanism, e.g., by showing otherwise internal acts taken, internal values used, or both
1612 visibility into an alert scoring process or mechanism
1614 send data, command, or other signal over a network
1616 receive data, command, or other signal over a network
1618 avoid using dimensionality reduction functionality
1622 avoid using default value padding functionality
1628 raise alarm because confidence score met or exceeded threshold; whether meeting threshold or exceeding threshold is alarm condition depends on implementation
1630 avoid raising alarm because confidence score did not meet or exceed threshold
1634 meet one or more performance criteria, e.g., as to repetition rate or duration to perform specified operations
1636 performance criteria, e.g., as to duration 1106 or repetition rate 1108
1638 access a log or other repository of event data
1640 any other step not specifically called out in the Figures but nonetheless taught herein
1642 rank insight instances
1644 configure an output device with a list of ranked insight instances; this is an example of configuring 1416
1646 standardize insight values
1648 map between alert and insight instance(s)
1650 prioritize alerts for administrative attention or control action Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security personnel, operations personnel, developers, engineers, auditors, and end-users are each a particular type of user 104, although it is contemplated that most users will likely have a role as security personnel or operations personnel. Automated agents, scripts, playback software, and the like acting on behalf of one or more people may also be users 104, e.g., to facilitate testing a system 102 or as part of an alert assessment or escalation business or technical process.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, data structures, or functionalities for instance, and may otherwise depart from the examples provided herein.

FIG. 2 illustrates aspects of some scoring architectures suitable for embodiments taught herein. A monitored system 202 and a monitoring system 206 communicate over one or more networks 108 in a loop, with event data 220 from the monitored system being assessed in the monitoring system, which may send the monitored system commands 222 in response to the assessment, leading to additional event data, which is then assessed, and so on. For example, the monitoring system's assessment may identify a security incident, and the resulting commands 222 may be part of an incident response which contains, eradicates, or recovers from the security incident. Or the monitoring system assessment may identify an operations vulnerability, and the commands 222 may be part of a proactive or reactive response which allocates additional storage, swaps drives, re-routes network traffic, reallocates network bandwidth, spins up additional compute resources, transfers a workload, or takes other computational resource management actions.

The illustrated monitored system 202 includes hardware 208 and may include software 210. A log or other data repository 212 may be maintained external to the monitored system, or within the monitored system 202.

As also shown in FIG. 2, monitoring may be performed using one or more monitors 204, which may be external or internal (or both) to the monitored system. Monitors 204 may be implemented in software running on general purpose hardware, or be implemented with software and special purpose hardware, or be implemented fully in hardware. Monitors may be or include event detectors 214. Monitors may include or be associated with controls 216 that take actions in response to commands 222. An administrator 218 may also be present, e.g., to receive and act on escalated alerts from the monitoring system.

A monitoring system 206 may include an insight extractor 224 which extracts insight values from event data 220 to facilitate assessment of the monitored system's state and score the severity of threats to its security or its operational capability or prospects. The illustrated monitoring system performs the assessments using components that are also discussed elsewhere herein, including a vectorizer 226 which produces feature vectors 228, an aggregator 230 which uses an aggregation function 232 to produce aggregated insight values 234 from extracted insight instances for inclusion in feature vectors 228, and a machine learning classifier 236 which assigns a confidence score 238 to a feature vector. The confidence score indicates the severity or credibility or urgency of an event data alert that is associated with the scored feature vector.

The systems 202 and 206 and the monitor 204 may each include, or consist of, or rely upon, one or more machines. A given machine is an example of a system 102, and each machine may be a physical machine or a virtual machine or a container running on underlying physical machine hardware, e.g., by way of at least a hypervisor or a management plane. The hypervisor may be a "bare metal" or type I hypervisor running directly on the hardware, or it may be a type II hypervisor which runs on a host operating system or another kernel that in turn runs directly on the hardware. Hardware in a given machine includes at least one processor 110 having one or more cores, and RAM or other working memory 112 in operable communication with the processor(s). The physical machine(s) or virtual machine(s) or container(s) may each be located in a public, private, hybrid, or community cloud, or may not be in a cloud.

FIG. 2 and other Figures herein provide examples, not a complete inventory of suitable scoring architectures. One of skill will acknowledge that teachings herein about obtaining event data and using machine learning to score alerts and other event data may also be applied with other scoring architectures.

Figure 3:
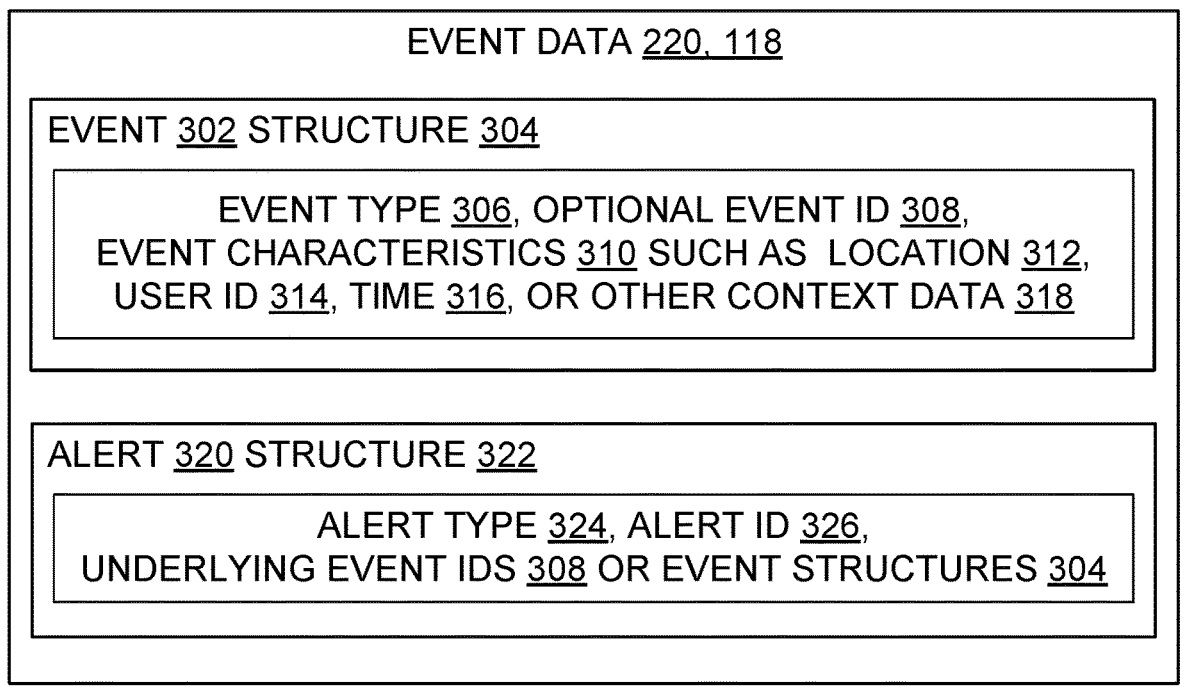
FIG. 3 is a block diagram illustrating aspects of a computing system event data, including events and alerts.

FIG. 3 illustrates event data 220. Examples of event data include events 302, which may be represented by event data structures 304, and alerts 320, which may be represented by alert data structures 322. Event structures 304 may include an event type 306, an event ID 308, and event characteristics 310 such as the location 312 of an event, the ID 314 of a user associated with an event, the point in time or time interval 316 of occurrence of an event, and other data 318 placing an event in context. Alert structures 322 may include an alert type 324, an alert ID 326, and underlying event structure 304 data. The IDs 308, 326 may be GUIDs (globally unique identifiers), indexes into a master log, or other identifiers, for example.

Figures 4, 5:
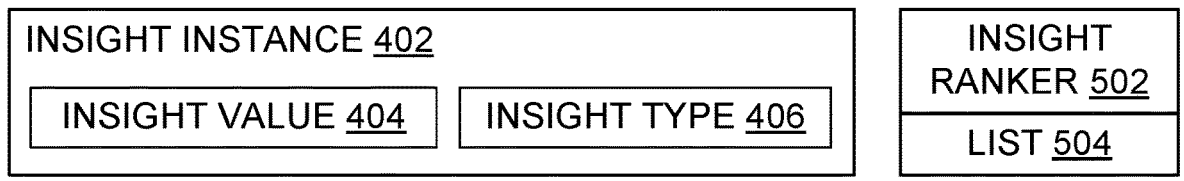
FIG. 4 is a block diagram illustrating aspects of an insight instance.
FIG. 5 is a block diagram showing an insight ranker and a ranked insight list.

FIG. 4 illustrates insight instances 402 which may be extracted from event data 220. A given insight instance 402 includes an insight value 404 and an insight type 406 which adds meaning to that value. FIG. 12 shows examples of insight types 406 and qualifiers 1202 that may be used in some cases to define insight types 406. Insight types called out in FIG. 12 include the number of processes created 1204 and the number of event occurrences 1206. Each of these may be qualified, e.g., as to which machine 1208 or which time interval 1210 the insight type represents. Measurements 1212 of a particular physical item, e.g., motion sensor, burglar alarm switch, or other physical device, may also serve as an insight type. Thus, as very specific examples, "front door openings between 10 p.m. and 7 a.m." is an insight type, "processes created on server-0113 in the last hour" is an insight type, and "failed login attempts with user ID sysguru on any machine within the past five minutes" is an insight type.

As shown in FIG. 5, an insight ranker 502 may rank insight instances 402, e.g., by placing them in an ordered list 504. Insight instances may be ranked according to any one or more event characteristics 310, and in particular they may be ranked according to their respective insight value contributions to an aggregated insight value 234. For example, if three insight instances denoted here as inst-0001, inst-0003, and inst-0347 have respective values 2, 6, and 4 for some particular insight type T, and an aggregation function sum( ) aggregates these values to form 2+6+4=12 as an aggregated insight value, then the ranking list from greatest to least contribution would be: inst-0003, inst-0347, inst-0001. The aggregation function sum may be referred to as "sum", "sum( )", or "sum 802", and other aggregation functions may similarly be denoted using various terminology.

Figure 6:
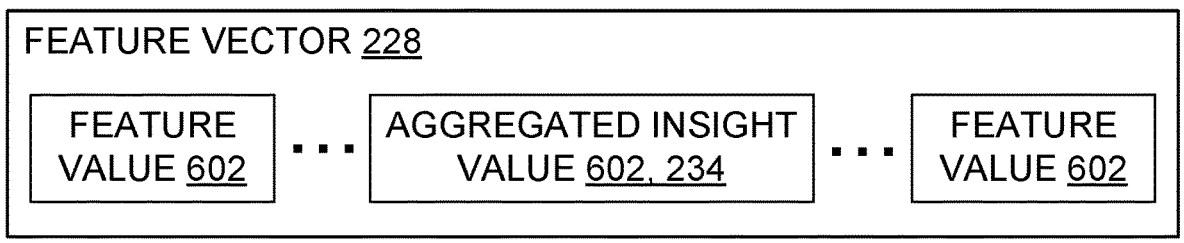
FIG. 6 is a block diagram illustrating aspects of a feature vector.

FIG. 6 illustrates feature vectors 228 which may be created by a vectorizer from insight values 404 extracted from event data 220. A given feature vector 228 includes multiple insight values 404, which are called "feature values" in the feature vector. One or more of the feature values 602 are an aggregated insight value 234, 404. Although not shown explicitly in FIG. 6, each feature value 602 has an associated insight type 406 which adds meaning to that value. The type of a feature value may also be referred to as a "feature type" or a "feature value type".

Although the aggregation function sum( ) is used in several examples herein, other aggregation functions 232 may be used in place of sum( ), or in combination with sum( ). FIG. 8 shows examples of aggregation functions 232, including sum 802, product 804, min 806 (minimum), max 808 (maximum), count 810, distinct count 812, median 814, mean 816, mode 818, expressions 820 which include one or more aggregation functions 232 with other evaluable code, and other routines 822 not already called out, e.g., x-percentile.

Figure 7:
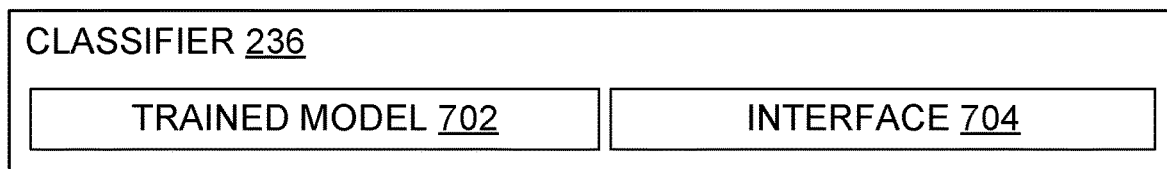
FIG. 7 is a block diagram illustrating aspects of a classifier.
Figure 9:
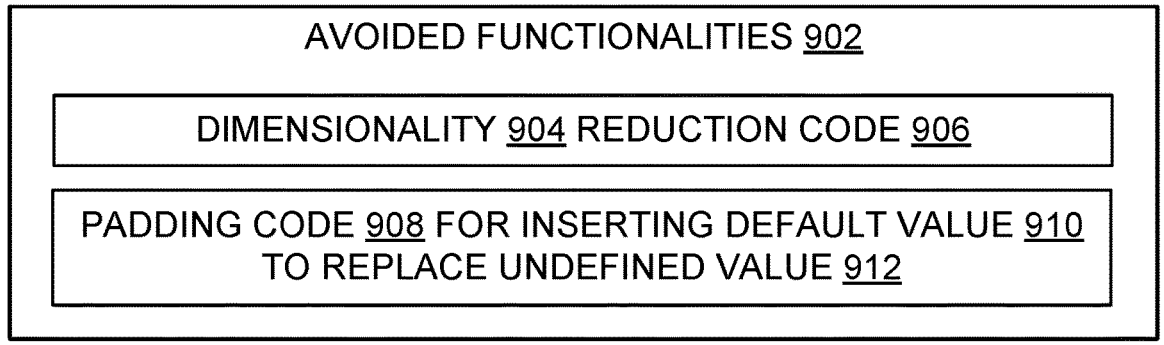
FIG. 9 is a block diagram illustrating some functionalities which are avoided in some embodiments.

FIG. 7 illustrates aspects of a machine learning classifier 236. The illustrated classifier includes a trained model 702, and an interface 704 for feeding vectors 228 to the trained model and receiving corresponding confidence scores 238 from the model 702. The interface may include APIs, especially when the classifier 236 is implemented as a cloud service. Classifier 236 functionalities 1002 are further illustrated in FIG. 10. As indicated, the classifier 236 may implemented using one or more of a neural network 1004, a deep learning network 1006, a convolutional network 1008, one or more decision trees 1010, a probabilistic classifier 1012, or a naïve Bayes classifier model 1014. The classifier 236 may also employ one or more other machine learning technologies 1016 not called out in FIG. 10, such as support vector machines, k-nearest neighbors classification technology, ensemble methods, or linear classification technology. FIG. 9 shows functionalities 902 that some embodiments avoid, including code 906 to reduce dimensionality 904 to use smaller vectors, and code 908 to replace undefined values 912 in vectors with some default value 910 such as zero or one.

FIG. 11 shows some additional characteristics 1100 of operating some systems. A monitoring system may impose a validity range 1102 on confidence scores, or compare confidence scores to an escalation threshold 1104, or do both. Performance may be measured using an insights-to-score duration 1106, a repetition rate 1108, or both, or other measures.

Figure 13:
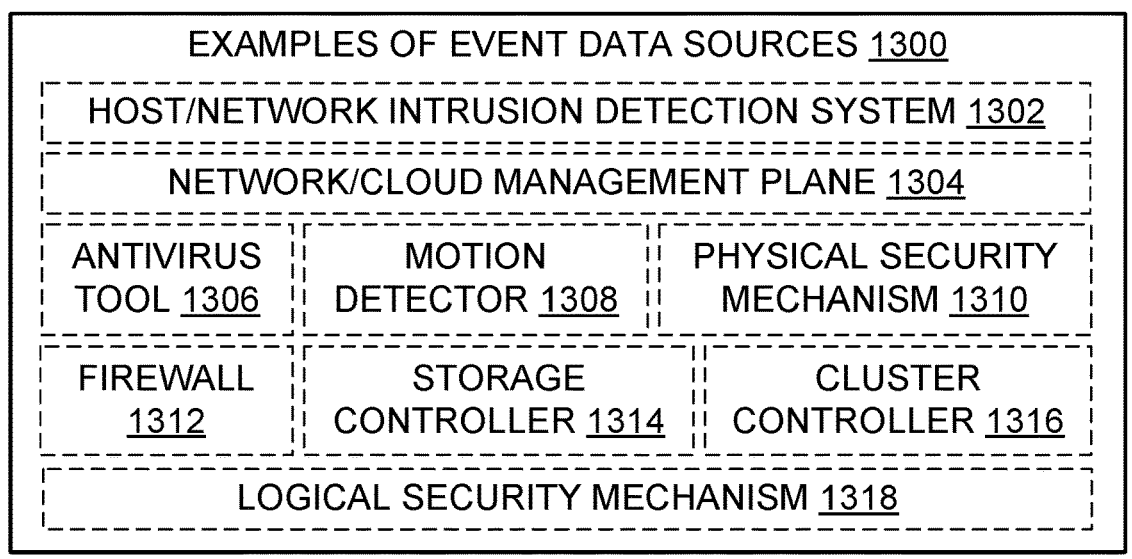
FIG. 13 is a block diagram illustrating some examples of sources of computing system event data.

FIG. 13 shows some examples of sources 1300 of event data 220. Illustrated data sources include intrusion detection or prevention systems 1302, management planes 1304, antivirus tools 1306 and firewalls 1312 and other logical security mechanisms 1318, motion detectors 1308 and other physical security mechanisms 1310, and computational resource controllers such as storage controllers 1314 or cluster controllers 1316. One of skill will acknowledge that these examples are not necessarily comprehensive for any particular system.

Some embodiments use or provide a monitoring computing system which is configured to perform alert confidence scoring. This monitoring system 206 includes one or more processors 110, a memory 112 in operable communication with at least one processor, and scoring-specific components. One scoring-specific component in this example is an aggregator 230 which upon execution with at least one processor receives insight instances 402. Each insight instance 402 has an insight value 404 and an insight type 406, and each insight instance is associated with an alert identifier 326 which identifies an alert that was previously generated from a monitor 204 through monitoring of a monitored system 202. The aggregator 230 is configured to aggregate insight values of received instances which have the same insight type.

Another scoring-specific component in this example is a vectorizer 226 which upon execution with at least one processor creates a feature vector 228 containing feature values 602. The feature values correspond to respective insight types 406. The feature vector contains at least one feature value 602 which is an aggregated insight value 234 that was produced by the aggregator 230 from multiple insight values 404. The feature vector is also associated with the identified alert 320.

Another scoring-specific component in this example is a classifier 236 which upon execution with at least one processor accepts the feature vector 228. The classifier is configured to assign a confidence score 238 to the alert 320, based at least partially upon the feature vector. The confidence score indicates a degree of confidence that the alert represents a threat to one or more operations of the monitored system 202. In this example, an output device such as a screen 126 is configured by the confidence score, e.g., by displaying the score 238.

In some embodiments, the monitoring computing system 206 includes, communicates with, or otherwise is combined with an insight extractor 224. The insight extractor is configured to receive the alert identifier 326 and extract the insight instances 402 from event data that are associated with the alert, so the vectorizer 226 and aggregator 230 can use at least some of the extracted insight instances as described herein.

In some embodiments, the monitoring computing system 206 is configured for enterprise production deployment in the sense that a total elapsed clock time 1106 from a starting point when the aggregator has received the insight instances, up to and including an ending point when the output device is configured by the confidence score, is less than one second. In some, this insights-to-score duration 1106 is less than 500 milliseconds, and in some it is less than 100 milliseconds. An acceptable insights-to-score duration 1106 for an implementation, particularly in a production environment, may also be defined by one of skill, or by industry standards, or by industry best practices, or by a service level agreement. Acceptable performance durations may also be defined using different starting and ending points.

In some embodiments, the aggregator 230 is configured to aggregate insight values by applying at least one of the following aggregation functions 232: sum 802, min 806, max 808, count 810, distinct count 812, mode 818, mean 816, or median 814. In some, the aggregator 230 applies exactly one aggregation function 232. In some, the aggregator 230 applies one or more aggregation functions 232 but produces only a single type 406 of aggregated insight values 234 for inclusion in feature vectors 228, while in other embodiments some or all feature vectors 228 each contain two or more aggregated insight values 234 of different respective types 406.

In some embodiments, the aggregator 230 is configured to aggregate a given set of multiple insight values at least twice, by applying to the multiple insight values at least two aggregation functions 232 which are denoted here as function-A and function-B. For example, three instance values 1, 3, 5 may be summed (function-A is sum 802) to produce aggregated insight value 1+3+5=9, and the same three instance values 1, 3, 5 may also be averaged (function-B is mean 816) to produce aggregated insight value (1+3+5)/3=3. In these example embodiments, the vectorizer 226 is configured to create a feature vector denoted here as vector-A containing a feature value denoted here as value-A which is an aggregated insight value produced by the aggregator's application of function-A to the multiple insight values, and the vectorizer 226 is also configured to create a feature vector denoted here as vector-B containing a feature value denoted here as value-B which is an aggregated insight value produced by the aggregator's application of function-B to the multiple insight values, value-B being different than value-A. In the specific example, the sum 9 would be placed in feature vector-A and the mean 3 would be placed in feature vector-B. In an alternate approach, also derived from the specific example's data, the vectorizer would create a single feature vector containing aggregated insight value 9 (sum) and also containing aggregated insight value 3 (mean). The respective insight types would include qualifiers 1202 such as "sum of . . . " and "mean of . . . ".

In these example embodiments with multiple aggregated insight values that are each calculated from the same underlying insight values and placed in respective feature vectors, the classifier 236 is configured to assign a confidence score denoted here as score-A to the alert based at least partially upon vector-A, and to assign a confidence score denoted here as score-B to the alert based at least partially upon vector-B. The output device 106 is then configured by at least one of the following: score-A, score-B, or a combined confidence score based on at least score-A and score-B, e.g., min(score-A, score-B) or max(score-A, score-B) or mean (score-A, score-B). In a variation, the classifier gets as an input a concatenation of vector-A and vector-B into a third vector-C. The classifier will then operate on a single vector-C producing a single score-C.

In some embodiments, the monitoring computing system 206 is free of dimensionality reduction functionality 906. In some, the monitoring system 206 is free of padding functionality 908 which pads undefined values in a feature vector with a default value. Some embodiments are free of both functionality 906 and functionality 908. As used here, "free of" means that the code in question is either present but disabled, or is not present and is also not called upon (it might be remote from the monitoring system). Either way, the monitoring system 206 is free of particular functionality when the monitoring system 206 does not rely upon that functionality to process event data 220 to assign a confidence score 238. Absence of particular functionalities from a given embodiment helps highlight distinctions between technology which is used in that embodiment and different technologies that might also involve feature vectors.

In some embodiments, the classifier 236 includes and uses at least one of the following: a naïve Bayes classifier model 1014, a neural network 1004, a deep learning network 1006, a convolutional network 1008, a decision tree 1010, or a probabilistic classifier 1012. Some classifiers use two or more of these functionalities in parallel, and then compare or combine their respective resulting scores 238 to arrive at a final confidence score 238 which is then potentially displayed to an administrator or used to drive control of the monitored system.

Some embodiments of the monitoring computing system 206 include an insight ranker 502 which upon execution with at least one processor ranks a plurality of the insight instances 402 according to their respective contributions to the confidence score 238. The output device 106 is configured with a ranking list 504 of the ranked insight instances. This list 504 may help provide visibility and understanding into how the displayed confidence score 238 was computed.

Visibility may also be provided 1610 by displaying event data 220 at one or more processing stages, e.g., raw data from a monitor, extracted insight instances, aggregated insight values, or feature vectors. Visibility may also be provided 1610 by displaying otherwise internal mechanisms such as insight type definitions 1508, or by displaying what kind of classifier functionality(ies) 1002 are being employed, e.g., a text phrase such as "Neural Network" or "Naïve Bayes".

Other system embodiments are also described herein, either directly or derivable as system versions of described methods or configured media, informed by the extension discussion herein of computing hardware.

Methods

Figure 14:
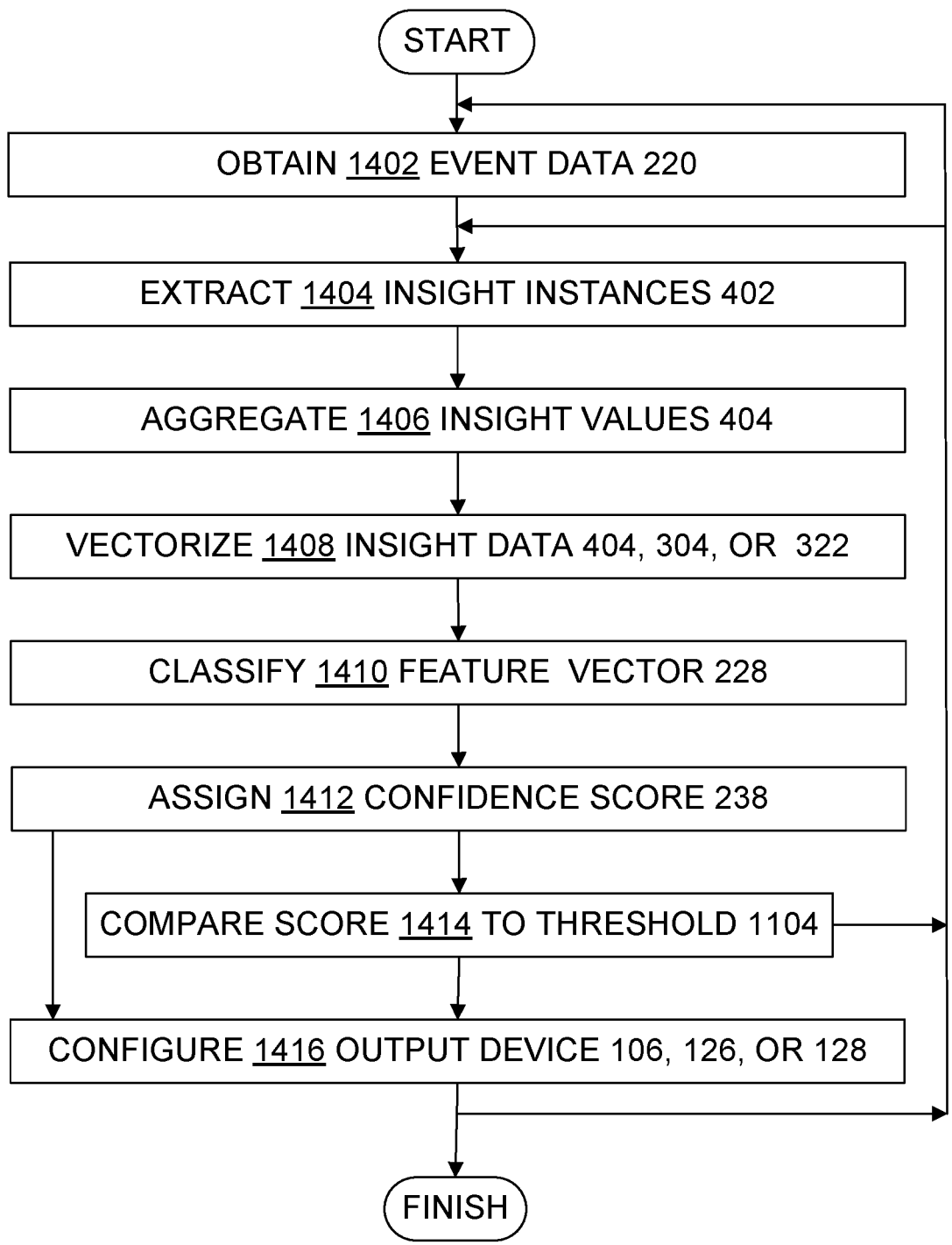
FIG. 14 is a flowchart illustrating steps in some alert confidence scoring methods.

FIG. 14 illustrates an example alert confidence scoring method 1400. An entity performing the method obtains 1402 event data 220, e.g., by receiving the event data over a network or through a direct electronic connection to a detector 214. The event data recipient entity extracts 1404 insight instances 402 from the event data, aggregates 1406 at least some of the extracted insight values 404, and vectorizes insight data 404, 304, 322 to create a feature vector 228. The vector is then classified 1410 and assigned 1412 a confidence score 238. The score output from the classifier may be scaled to a desired range and granularity for display, e.g., [0 . . . 1] in increments of 0.1, or [0 . . . 100] in increments of 1. The final confidence score 238 may be reported 1416 through an output device, possibly after being compared 1414 (either before or after scaling) to a threshold 1104 to determine that it is large enough to report 1416. Steps may be repeated to process additional event data.

Figure 15:
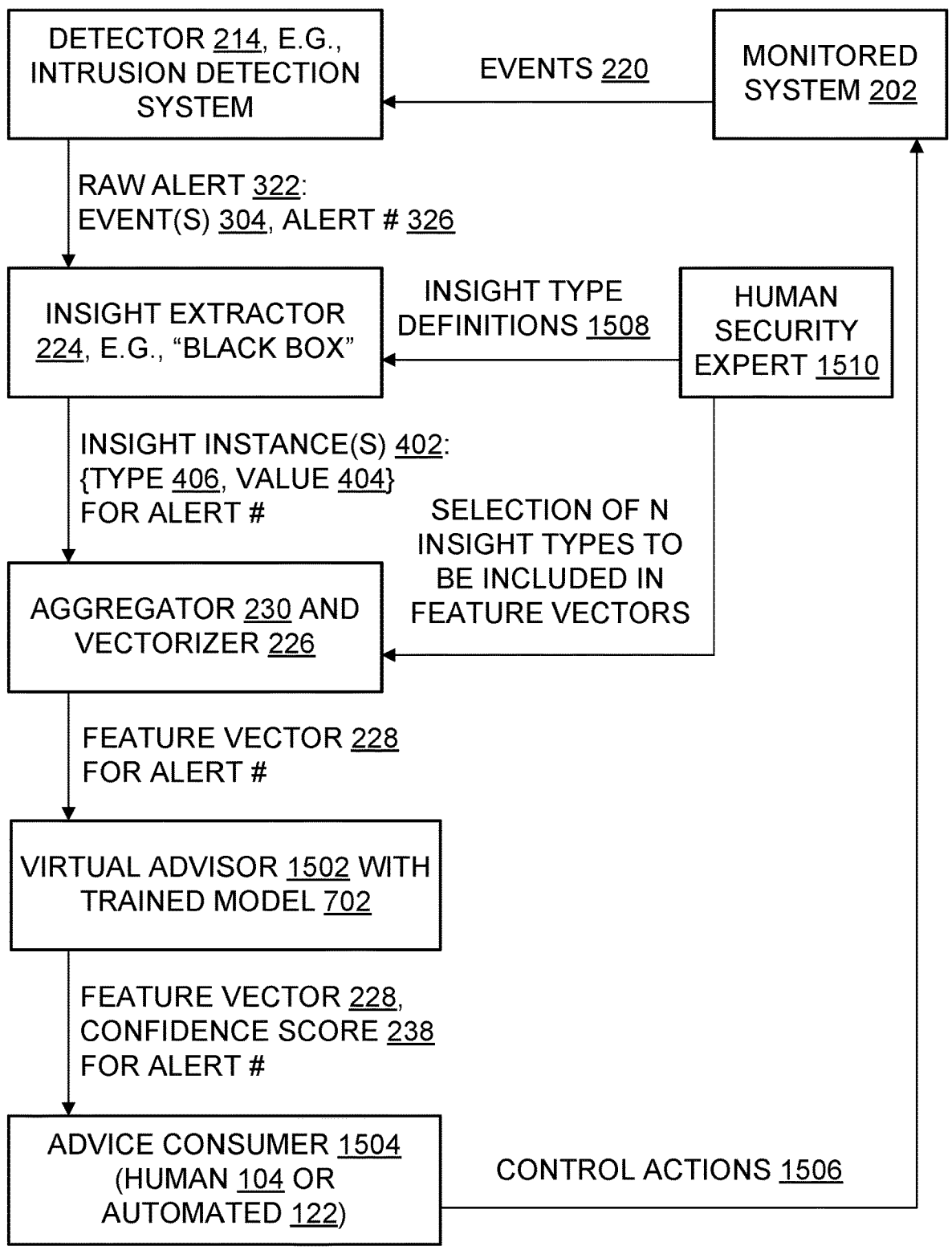
FIG. 15 is a data flow diagram illustrating usage of an alert confidence scoring method.

FIG. 15 illustrates a usage 1500 of an alert confidence scoring method, such as method 1400. A monitored system 202 undergoes events 302, some of which are detected by a detector 214. The detector generates event data 322, such as a raw (i.e., unscored) alert 322, and other electronic representations of events 304. The alert in this example has an alert identifier 326. This event data travels to an insight extractor 224, which may be viewed from one perspective as a "black box" that extracts insights 402 from event data using insight type definitions 1508 previously provided by a human security expert 1510. Human experts may define the N insight types according to their domain knowledge. The human expert may have decided, for example, that tracking both failed login attempts and successful login attempts is helpful to promote cybersecurity, and accordingly may have defined one instance type 406 that represents failed login attempts and another instance type 406 that represents successful login attempts. The insight extractor 224 accordingly extracts instance values 404 that match these defined types, when the extractor encounters those values 404 in the event data. Extracted instances 402 travel to an aggregator 230 and a vectorizer 226, which collectively produce a feature vector 228 corresponding to the alert identifier 326 and having at least one aggregated insight value 234. The feature vector 228 is fed to a virtual advisor 1502 which applies a classifier model 702 to produce a confidence score for the vector and hence for the associated event data including the identified alert. An advice consumer 1504 may use the confidence score as a trigger or guide to exert control actions 1506 which operate on the monitored system. The monitored system undergoes additional events, possibly as a result of the control action, and the illustrated monitoring-and-controlling loop continues.

Figure 16:
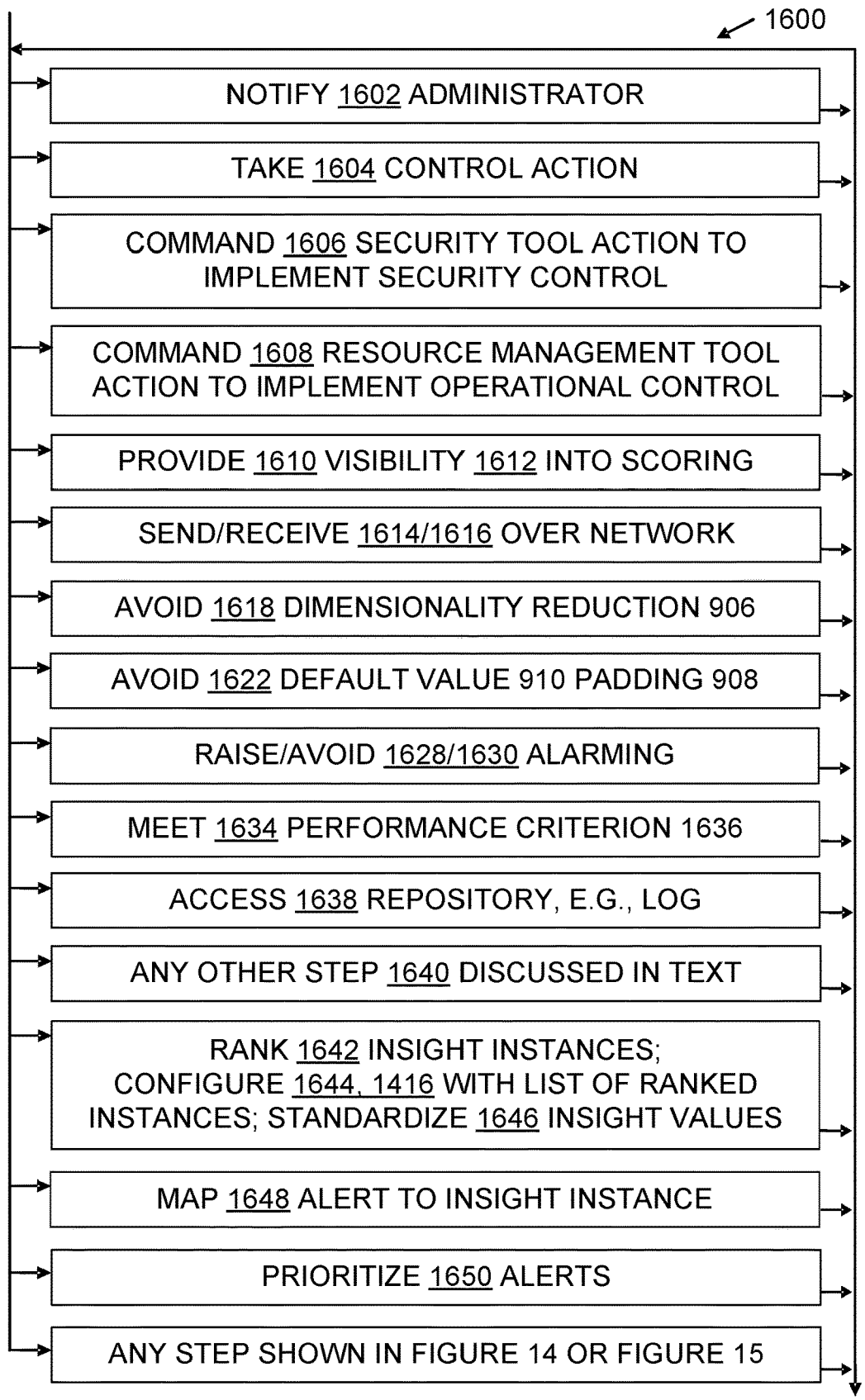
FIG. 16 is a flowchart further illustrating steps in some alert confidence scoring methods.

Technical methods shown in the Figures or otherwise disclosed will be performed automatically, e.g., by a virtual advisor 1502 or monitoring system 206, unless otherwise indicated. Methods may also be performed in part automatically and in part manually to the extent action by a human administrator or other human person is implicated, e.g., entering a command to show details of an escalated alert. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 14 and 16. Steps may be performed serially, in a partially overlapping manner, or fully in parallel. In particular, the order in which flowchart 1400 or flowchart 1600 or the FIG. 15 event data monitoring and controlling loop items are traversed to indicate the steps performed during a method may vary from one performance of the method to another performance of the method. The traversal order may also vary from one method embodiment to another method embodiment. Steps may also be omitted, combined, renamed, regrouped, be performed on one or more machines, or otherwise depart from the illustrated flow, provided that the method performed is operable and conforms to at least one claim.

Some embodiments use or provide a method for assigning a confidence score to data that was generated from monitoring a monitored system. This method includes obtaining 1402 digital electronic event data which includes or otherwise identifies at least one of the following: one or more event structures generated from the monitoring, an alert structure generated from the monitoring, or an alert identifier which identifies an alert structure generated from the monitoring. This method also includes extracting 1404 multiple insight instances from the event data, each insight instance having an insight value and an insight type, and automatically aggregating 1406 insight values of at least two insight instances which have the same insight type, thereby producing an aggregated insight value. This method also includes automatically vectorizing 1408 insight data by creating a feature vector containing feature values, the feature values corresponding to insight types, and the feature vector containing the aggregated insight value as one of the feature values. This method also includes classifying 1410 the feature vector using a machine learning driven classifier, and assigning 1412 at least one confidence score to the event data based on a result of the classifying, with each confidence score indicating a degree of confidence that the event data represents a threat to one or more operations of the monitored system. This method also includes configuring 1416 an output device with at least one assigned confidence score.

In some embodiments, the confidence score exceeds 1414 a predetermined threshold 1104, and the method accordingly further includes at least one of the following: notifying 1602 a human administrator of at least a portion of the event data, displaying a list of alerts ranked according to respective confidence scores, automatically taking 1604 a control action to implement control of the monitored system, automatically commanding 1606 a security tool to take a security control action to implement security control of the monitored system, or automatically commanding 1608 a resource management tool to take an operational control action to implement operational control of the monitored system.

In some embodiments, the method includes providing 1610 visibility 1612 into confidence scoring by displaying 1416 on the output device in a human-legible format at least one of the following items: at least a portion of the event data 220 obtained, at least one insight type definition 1508 which was utilized while extracting multiple insight instances, at least two of the extracted insight instances 402, a name of at least one aggregation function 232 which was utilized while aggregating insight values, or at least one of the feature values 602.

In some embodiments, the method includes sending 1614 the assigned confidence score to the output device over a network connection. In some, other data such as visibility data 1612, a list 504, raw data 220, or a combination thereof is also sent 1614 over one or more network connections.

In some embodiments, the method repeats at least the following steps multiple times: extracting 1404, aggregating 1406, vectorizing 1408, classifying 1410, and assigning 1412. In some of these, the method further includes comparing 1414 the resulting assigned confidence scores to a predetermined threshold 1104, raising 1628 an alarm when one of the assigned confidence scores exceeds the predetermined threshold, and avoiding 1630 raising an alarm when one of the assigned confidence scores does not exceed the predetermined threshold. Raising an alarm based on a high confidence score of an alert is an example of escalating the alert.

In some embodiments, the method performs repetitions in a monitoring system by automatically repeating at least the following multiple times: extracting 1404, aggregating 1406, vectorizing 1408, classifying 1410, and assigning 1412. Other steps may also be used to define a repetition, and hence a repetition rate. In some of these, the method performs said repetitions at an average rate 1108 of at least one repetition per minute over a duration of at least one hundred hours. In some embodiments, the repetition rate is at least one repetition per minute over a duration of at least ten hours. In some embodiments, the repetition rate is at least one repetition per minute over a duration of at least two hours. In some embodiments, the repetition rate is at least ten repetitions per minute over a duration of at least ten hours. In some embodiments, the repetition rate is at least ten repetitions per minute over a duration of at least two hours. An acceptable repetition rate for an implementation, particularly in a production environment, may also be defined by one of skill, or by industry standards, or by industry best practices, or by a service level agreement.

In some embodiments, vectorizing 1408 creates a feature vector containing one or more feature values corresponding to one or more insight types 406 which represent at least one of the following: number of processes created on a machine of the monitored system, number of processes created on a machine of the monitored system within a specified time interval, number of occurrences of a particular kind of event on one or more machines of the monitored system, or number of occurrences of a particular kind of event on one or more machines of the monitored system within a specified time interval.

In some embodiments, the method obtains 1402 digital electronic event data 220 which includes or otherwise identifies at least one of the following: digital electronic event data generated by a host-based intrusion detection system 1302, digital electronic event data generated by a network-based intrusion detection system 1302, digital electronic event data generated by an antivirus tool 1306, digital electronic event data generated by a firewall 1312, digital electronic event data generated by a motion detector 1308, digital electronic event data generated by a storage controller 1314, digital electronic event data generated by a cluster controller 1316, digital electronic event data generated by a management plane 1304, digital electronic event data generated by a mechanism 1310 configured to enhance physical security, or digital electronic event data generated by a mechanism 1318 configured to enhance logical security.

In some embodiments, extracting 1404 multiple insight instances from the event data includes accessing 1638 a log or other repository and mapping 1648 an alert to at least some of the insight instances.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as aggregators 230, confidence scores 238, and virtual advisors 1502, in the form of data 118 and instructions 116, read from a removable storage medium 114 and/or another source such as a network connection, to form a configured storage medium. The configured storage medium 112 is capable of causing a computer system to perform technical process steps for confidence scoring of alerts as disclosed herein. The Figures thus help illustrate configured storage media embodiments and process embodiments, as well as system and process embodiments. In particular, any of the process steps illustrated in FIG. 14, 15, or 16, or otherwise taught herein, may be used to help configure a storage medium to form a configured storage medium embodiment.

Some embodiments use or provide a storage medium 112, 114 configured with code which upon execution by one or more processors performs a confidence scoring method which includes obtaining 1402 digital electronic event data which includes or otherwise identifies an alert that was previously generated from a monitor through monitoring of a monitored system, extracting 1404 multiple insight instances from the event data with each insight instance having an insight value and an insight type, aggregating 1406 insight values of at least two insight instances which have the same insight type to produce an aggregated insight value, and vectorizing 1408 insight data by creating a feature vector containing feature values, with the feature values corresponding to insight types and the feature vector containing the aggregated insight value as one of the feature values. This confidence scoring method also includes classifying 1410 the feature vector using a machine learning driven classifier, and assigning 1412 at least one confidence score to the alert based on a result of the classifying. The confidence score may indicate a degree of confidence that the alert represents a threat to one or more operations of the monitored system. This confidence scoring method also includes configuring 1416 an output device with at least one assigned confidence score, so that monitored system functionality can be improved based on high confidence scores and the underlying event data.

In some embodiments, the method is further characterized by at least three of the following listed refinements: (a) aggregating 1406 includes applying at least one of the following aggregation functions: sum, min, max, count, distinct count, x-percentile, mode, mean, or median; (b) the method includes applying at least two aggregation functions to a particular set of insight instances, thereby producing at least two different aggregated insight values 234, and creating and classifying 1410 at least two corresponding feature vectors which result in at least two corresponding confidence score assignments for the particular set of insight instances; (c) the method includes sending 1614 at least the assigned confidence score to the output device from a cloud service over a network connection; (d) the method includes automatically commanding 1606 a tool to take a control action to mitigate a security risk to the monitored system; (e) the method includes automatically commanding 1608 a tool to take a control action to alter accessibility of a computational resource of the monitored system; (f) the method includes ranking 1642 a plurality of the insight instances according to their respective contributions to the confidence score, and configuring 1644 the output device with a list of the ranked insight instances; or (g) extracting 1404 multiple insight instances from the event data includes extracting 1638 event data from a log 212. In some embodiments, the method is characterized by at least four of the listed refinements. In some, the method is characterized by at least five of the listed refinements. More generally, the method may be characterized in a given situation by anywhere from zero to all of the listed refinements.

Events Versus Alerts

In cybersecurity generally, a distinction is sometimes made between events and alerts, treating them as two different but related things. Events are things that happened and got noticed by some kind of monitoring or logging agent, e.g., a failed login attempt, a successful login, an application launch, detection of a packet on a particular port, and so on and on and on. The number of events noted in a system can be massive. Most events are routine and do not indicate any problem. By contrast, alerts (in this view) are a response to certain events or groups of events, and indicate there might be a problem. For instance, an alert might be generated by several failed logins to an admin's account followed by a successful login to that account, or by the launch of a Metasploit application, or by the detection of traffic on a port that is typically used for online gaming.

This distinction between events and alerts also holds in the context of the present description, with some refinements. For example, a virtual advisor 1502 can be viewed as another layer on top of a detection algorithm, in the sense that the virtual advisor gets as an input events which the underlying detection algorithm considers alerts. The virtual advisor gives these alerts a confidence score indicating whether they are indeed alerts, or only normal events. For instance, the virtual advisor may elevate an alert to an alarm status, or take control action based on the alert and its relatively high confidence score.

A Walk-Through

As a further illustration of data flow in one embodiment that is consistent with the usage shown in FIG. 15, a walk-through is provided below. One of skill will recognize that many other walk-through and installations, with this particular alert scoring architecture or with others, may include one or more insight types, insight values, alert formats, or other details that differ from this particular walk-through even though the installation in question embodies teachings presented herein.

These data values are mock values, but are realistic in that they help show how specific data values would be processed and generated in a particular embodiment. They are not actual live production data.

1. The detector receives event: failed login attempt on device PatsTablet at 23:55:01.
2. The detector receives event: failed login attempt on device PatsTablet at 23:55:16.
3. The detector receives event: failed login attempt on device PatsTablet at 23:55:31.
4. The detector receives event: successful login on device PatsTablet at 23:55:46.
5. The detector receives event: process rmt-devl started on device PatsTablet at 23:56:47.
6. The detector receives event: process bitminer00 started on device PatsTablet at 23:57:02.
7. The detector receives event: process bitminer01 started on device PatsTablet at 23:57:22.
8. The detector receives event: process bitminer02 started on device PatsTablet at 23:57:42.
9. The detector sends alert #123456 and the underlying eight events to the insight extractor. This alert and its underlying events might also be logged, and might also be sent to other software, e.g., a SIEM.
10. The insight extractor sends the following insight instances to the aggregator-and-vectorizer: {login-failed, 1, 123456}, {login-failed, 1, 123456}, {login-failed, 1, 123456}, {unknown-process, 1, 123456}, {unknown-process, 1, 123456}, {unknown-process, 1, 123456}, {unknown-process, 1, 123456}.
11. The aggregator aggregates the login-failed instances into {login-failed, 3, 123456}.
12. The aggregator aggregates the unknown-process instances into {unknown-process, 4, 123456}.
13. The vectorizer produces this feature vector: [login-failed: 3, unknown-process: 4, alert-id: 123456].
14. The feature vector is fed to the virtual advisor, which uses the model to produce this result:

[login-failed: 3, unknown-process: 4, alert-id: 123456, is-incident: 0.78], indicating a 0.78 probability that the alert represents a security incident. Or the output could be formatted as [alert-id: 123456, is-incident: 0.78].

More generally, one of skill will recognize that not every part of this disclosure, or any particular details therein, are necessarily required to satisfy legal criteria such as enablement, written description, or best mode. Also, embodiments are not limited to the particular programming languages, tool contexts, identifiers, fields, class definitions, or other implementation choices described herein. Any apparent conflict with any other patent disclosure, even from the owner of the present innovations, has no role in interpreting the claims presented in this patent disclosure.

Model Training

During training, the model being trained get alerts and their labels. One constructs alert feature vectors and submits them to the model for learning. During classification, one again constructs the feature vector of an alert and computes its score. To train the virtual advisor model 702, the model is fed training data in the form of feature vectors with associated labels. The label indicates whether the feature vector is (or is not) indicative of a security incident (for security training) or an operational incident (for resource management or other operational training). The training data is prepared manually, e.g., by human security experts or human operations managers. Note that at this stage, the training algorithm might perform feature selection using machine learning methods, in order to improve the model's quality. Feature selection may choose to use a subset of the N features.

Additional Examples and Observations

Consistent with aspects of FIG. 15 and other teachings herein, in some installations of alert confidence scoring technology, some kind of detector 214 receives events, and in response to some of those events the detector provides an alert 320. This may be called a "raw alert" to indicate that it has not yet been processed through the virtual advisor 1502. The detector could be a host-based intrusion detection system, a network-based intrusion detection system, antivirus software, a firewall, a motion detector, or some other physical or technical (i.e., software) security mechanism, for example. In some installations, the alert includes a description of one or more events, and the alert also includes an alert number so that the alert can be tracked as it is being managed. In other installations, a description of events is not conveyed directly; all the insight extractor receives is an alert number (e.g., a unique id which is not necessarily assigned sequentially), and some description of the alert's characteristics. The alert's description may be domain-specific or implementation-specific.

More generally, the raw alert includes a description of events, or alert characteristics, or a reference to such information. The alert 320 itself may be implemented simply as an alert number, when the alert number serves as a pointer, index, or key to locate some description of the circumstances that gave rise to the alert or a description of the alerts characteristics that implies or summarizes those circumstances. In addition to indicating the nature of the events 302 that gave rise to the alert, the alert characteristics 310 may include, e.g., (a) the machine ID, subnet address, process ID, or other location information, (b) the user ID(s) involved, (c) the occurrence time(s), (d) the security credentials presented, and (e) other relevant information.

In some installations, the alert goes into a module 224 that may be treated as a "black box" but is referred to here as an "insight extractor". The insight extractor 224 uses insight type definitions 1508 provided by a human security expert to find insight instances in the events that are associated with the raw alert. Each insight instance includes an insight type and an insight value. The insight extractor produces one or more insight instances from the given alert. In some installations, the insight extractor uses insight type definitions provided by a human security expert together with logic (hardware and software operating together) that is based on security experts' knowledge in order to extract 1404 insight instances that characterize an alert. For this purpose, the insight extractor uses repositories 212 such as the monitored system's logs in order to associate insight instances to alerts. For example, given an alert happening on machine M (M would be part of the alert's description), an insight instance could state the number of processes created on machine M in some time interval. This information is extracted from the system's logs.

In some installations, the insight instances and their associated alert number go into a module called an "aggregator and vectorizer". The aggregator part of this module aggregates the respective values of multiple instances which have the same insight type, e.g., by summing them. Other aggregation functions can be used instead of summing, or in addition to summing. Then the vectorizer part of this module creates a feature vector using the aggregated instance values. Each entry in the feature vector corresponds to an insight type. In some cases, a human security expert selects the N insight types to include in the feature vector. The vector is N-dimensional and each entry corresponds to an insight type. The selection of N insight types was done earlier, that is, they were "pre-defined", as opposed to the N insight types being selected in response to the alert. When the instances for a given alert don't match the pre-defined insight types, an exception may be raised, undefined values may be padded with default values, or processing of the insight instances may be terminated without producing a feature vector, depending on the particular implementation.

When processing proceeds, the feature vector (still being tracked with the alert ID) is fed into a virtual advisor 1502 which has a trained machine learning model 702. Based on the model, the virtual advisor assigns the feature vector a confidence score indicating the level of confidence that the feature vector is (or is not) indicative of a security incident. Thus, a hierarchy used in this example is event→alert→incident, with events being the least serious and incidents being the most serious. In this example, the feature vector, the tracking number (i.e., alert ID), and the confidence score 238 are given to an advice consumer 1504. In other versions, feature vectors are not returned to the advice consumer; only the confidence score of the alert is returned from the advisor 1502. The advice consumer 1504 may be a human administrator 104, or it may be software such as Security Information and Event Management (SIEM) software. The advice consumer may then take one or more control actions 1506 in response to the advice, e.g., investigate further, escalate the alert, try to contain an incident, failover to redundant resources, and so on.

Some embodiments include a system 206 having an input interface configured to receive insight instances 402 which each include a type and a value, aggregator code 230 which aggregates values of received instances having the same type, vectorizer code 226 which creates a feature vector 228 containing feature values corresponding to insight types, an output interface configured to provide the feature vector to a trained model 702, and the trained model which is configured to assign confidence scores 238 to feature vectors indicating the confidence that the respective feature vectors represent security incidents.

In some contexts, a machine learning algorithm operates on a set of "examples" which come from some real-world domain. In some cases of particular interest herein, the examples are alerts 320. To help avoid confusion, examples in the sense of "examples fed to a machine learning algorithm" are denoted herein "instances" and illustrated insight instances 402.

A machine learning algorithm transforms an instance into a mathematical N-dimensional vector of a fixed size N. Each vector entry contains a value, e.g., some number. In order to do a transformation, one defines N "features" according to the problem domain, e.g., through "feature engineering". Thus, if instances represent patients, features could be temperature, blood type, etc. Each vector entry represents some feature. For a given instance, the vector entry holds the feature's value for that instance.

As another example, assume an embodiment recognizes two pre-defined insight types 406, namely, a type A representing the number of incidents that occurred on a machine, and a type B representing the number of processes spawned by a given process. Assume an alert occurs where for insight type A there are three insight instances with values: 2,2,4, and for insight type B there are four values: 1,12,2,4. Prior to receiving the alert, the embodiment does not know the number of insight instances it will be processing. In this example, assume the event's feature vector has two entries (i.e., two slots, two values 602), and the aggregation function used is sum 802. Then after aggregation and vectorization the first entry of the vector holds the sum of insight A values (2+2+4), and the second holds the sum of insight B values (1+12+2+4).

Although the number of features may be fixed (in some installations all feature vectors are of the same structure—they are N-dimensional), the number of insight instances underlying a given feature vector may vary. In some cases, an alert is associated with an unbounded number of insight instances. These are not structured as multiple N-dimensional vectors. Approaches that reduce vector dimensionality or pad vectors to put a value in each of the N slots regardless of the underlying event data are not applicable to the challenge of meaningfully processing an arbitrary number of insight instances into a feature vector with a fixed number of values 602. However, in hindsight one may observe that each instance insight is associated with an insight type, and that the number of insight types is bounded. This observation may help one appreciate the teachings described herein for bounding insights to match bounded vectors.

In other words, in some embodiments the number of insight types is fixed to N, and is pre-defined by human security experts. Given an event, a black box procedure generates multiple insight instances for that event. Each insight instance has a value, and it belongs to some (single) instance type. For each insight type, the embodiment aggregates the values of all its instances into a single value. Each insight type serves as a feature, and its aggregated value serves as that feature's value. These are used by the classifier algorithm. So one ends up with N insight types, which correspond to N features, and each feature has a value. Given that, one may represent an event by the corresponding N-dimensional feature vector and leverage familiar machine learning classifier technologies. The number of features is bounded and is N. For a given alert, the number of values per insight is not bounded, therefore, the embodiment aggregates them into a single value.

In some embodiments, the insight extractor executes a procedure that follows the logic of a security expert. The procedure generates a set of insights that characterize security aspects of the event. This procedure gets an event as an input, and generates a set of insights, each with multiple values. This may be accomplished, e.g., using a set of rules which output security insights per event. Since the event rate is typically high in a cloud setting, this procedure is automated. The procedure's output may be used as features for the supervised learning part, which again is done by computers.

Several examples are given herein of aggregation functions that can be used, including sum, min, max, count, distinct count, average (a.k.a. mean), median, x-percentile, and others. In some cases, more than one may be useful. For example, one may choose to use both min, max and mean. In this case, for each insight type an embodiment could have three features (instead of one), namely, features based on the min, the max, and the mean, respectively, of the insight instance's values. Hence an embodiment using three aggregation functions could have a total of 3*N features. To determine which aggregation function is useful or not, one could perform machine learning procedures of feature selection.

One implementation uses the sum function for aggregation 1406, and accumulates the contribution of all instances of the corresponding feature type. However, other aggregation functions could be used, e.g., max, min, and so on. This implementation also standardizes 1646 the values of each insight type prior to aggregation using z-score standardization.

When representing an event by an N-dimensional feature vector over the insight types, this implementation sets the value of each insight type feature by its corresponding aggregated value. Having fixed size feature vectors 228, the implementation applies supervised machine learning techniques in order to compute confidence scores 238 of alerts. Toward that end, a classifier is trained over a set of events, such as process creation events, which were previously seen in the monitored system. For each event, the embodiment constructs its feature vector as previously described. In addition, security analysts label each event as malicious or non-malicious. At runtime, given an unseen event, the trained classifier runs and outputs its confidence score on whether the event is malicious. In addition or alternatively, operations analysts could label each event with labels for non-security monitoring, e.g., near-capacity or not-near-capacity, performing-well or performing-badly, thrashing or not-thrashing, reliable or not-reliable, and so on. Then at runtime, given an unseen event, the trained classifier runs and outputs its confidence score on whether the event indicates an operations problem or not.

Some embodiments implement classification 1410 using logistic regression. The classifier may be evaluated it over a test set of labeled events using metrics, e.g., using mean average precision (MAP) and accuracy. In one internal test of a dataset, the MAP was approximately 0.92 and accuracy was approximately 0.85.

Some embodiments provide a confidence level for alerts classified by security experts. They accomplish this by combining an analysis of training data by human experts with a machine learning algorithm.

Some embodiments facilitate or enable usage of supervised machine learning over a variable and dynamic number of insights. The number of insights varies among events, and is unknown a priori, being generated instead at runtime for a given event according to an expert's logic.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

In short, with the benefit of teachings provided herein, an embodiment may be used to automate triage 1650 of security and operational alerts. Insight instances 402 extracted 1404 from raw event data 220 that is associated with an alert 320 are aggregated 1406, vectorized 1408, and assigned 1412 confidence scores 238 through classification 1410 that is based on machine learning. Confidence scoring enables heavily loaded administrators 218 and controls 216 to focus attention and computational resources where they are most likely to protect or improve the functionality of a monitored system 202. Feature vectors 228 receive a broad base in the underlying instance values 404 through aggregation 1406, even when the number of instance values is unknown prior to receipt of the event data. Visibility 1612 into the confidence scoring process may be provided 1610, to allow tuning of an embodiment (e.g., by varying the aggregation function 232 used or limiting the number of values 404 per aggregated insight value 234). Visibility may also inform further training of a classifier model 702. Performance metrics 1106, 1108, 1636 are defined, and production level performance may be achieved 1634.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 11 and 13 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A monitoring computing system configured to perform alert confidence scoring, the monitoring computing system comprising:
    one or more processors;
    a memory in operable communication with at least one processor;
    an aggregator which upon execution with at least one processor receives insight instances, each insight instance having an insight value and an insight type, each insight instance associated with an alert identifier which identifies an alert that was previously generated from a monitor through monitoring of events of a monitored system, the aggregator configured to aggregate insight values of received instances which have the same insight type;
    a vectorizer which upon execution with at least one processor creates a feature vector containing feature values, the feature values corresponding to insight types, the feature vector containing at least one feature value which is an aggregated insight value produced by the aggregator from multiple insight values, the feature vector associated with the alert;
    a classifier which upon execution with at least one processor accepts the feature vector, the classifier configured to assign a confidence score to the alert based at least partially upon the feature vector, the confidence score indicating a degree of confidence that the alert represents a threat to one or more operations of the monitored system; and
    an output device configured by a list of alerts which are ranked relative to one another based on respective confidence scores assigned by the classifier.

2. The monitoring computing system of claim 1, in combination with an insight extractor which is configured to receive the alert identifier and extract the insight instances from event data that are associated with the alert.

3. The monitoring computing system of claim 1, wherein the monitoring computing system is configured for enterprise production deployment in that a total elapsed clock time from a starting point when the aggregator has received the insight instances, up to and including an ending point when the output device is configured by the confidence score, is less than one second.

4. The monitoring computing system of claim 1, wherein the aggregator is configured to aggregate insight values by applying at least one of the following aggregation functions: sum, min, max, count, distinct count, x-percentile, mode, mean, or median.

5. The monitoring computing system of claim 1, wherein:
    the aggregator is configured to aggregate the multiple insight values at least twice, by applying to the multiple insight values at least two aggregation functions which are denoted here as function-A and function-B;
    the vectorizer is configured to create a feature vector denoted here as vector-A containing a feature value denoted here as value-A which is an aggregated insight value produced by the aggregator's application of function-A to the multiple insight values;
    the vectorizer is configured to create a feature vector denoted here as vector-B containing a feature value denoted here as value-B which is an aggregated insight value produced by the aggregator's application of function-B to the multiple insight values, value-B different than value-A;
    the classifier is configured to assign a confidence score denoted here as score-A to the alert based at least partially upon vector-A;
    the classifier is configured to assign a confidence score denoted here as score-B to the alert based at least partially upon vector-B; and
    the output device is configured by at least one of the following: score-A, score-B, or a combined confidence score based on at least score-A and score-B.

6. The monitoring computing system of claim 1, wherein the monitoring computing system is free of each of the following:
    dimensionality reduction functionality; and
    padding functionality which pads undefined values in a feature vector with a default value.

7. The monitoring computing system of claim 1, wherein the classifier comprises at least one of the following:
    a naïve Bayes classifier model;
    a neural network;
    a deep learning network;
    a convolutional network;
    a decision tree; or
    a probabilistic classifier.

8. The monitoring computing system of claim 1, further comprising an insight ranker which upon execution with at least one processor ranks a plurality of the insight instances according to their respective contributions to the confidence score, and wherein the output device is further configured with a ranking list of the ranked insight instances.

9. A method for assigning a confidence score to data that was generated from monitoring events of a monitored system, the method comprising:
  obtaining digital electronic event data which includes or otherwise identifies at least one of the following: one or more event structures generated from the monitoring, an alert structure generated from the monitoring, or an alert identifier which identifies an alert structure generated from the monitoring;
  extracting multiple insight instances from the event data, each insight instance having an insight value and an insight type;
  automatically aggregating insight values of at least two insight instances which have the same insight type, thereby producing an aggregated insight value;
  automatically vectorizing insight data by creating a feature vector containing feature values, the feature values corresponding to insight types, the feature vector containing the aggregated insight value as one of the feature values;
  classifying the feature vector using a machine learning driven classifier;
  assigning at least one confidence score to the event data based on a result of the classifying, each confidence score indicating a degree of confidence that the event data represents a threat to one or more operations of the monitored system; and
  configuring an output device with a list of alerts ranked according to respective confidence scores;
  wherein the method is performed using monitored system data which includes monitored events and which also includes alerts based on monitored events, and wherein alerts are distinguished from monitored events in that some monitored events are not associated with any alert.

10. The method of claim 9, wherein the method further comprises at least one of the following:
  notifying a human administrator of at least a portion of the event data;
  automatically taking a control action to implement control of the monitored system;
  automatically commanding a security tool to take a security control action to implement security control of the monitored system; or
  automatically commanding a resource management tool to take an operational control action to implement operational control of the monitored system.

11. The method of claim 9, further comprising providing visibility into confidence scoring by displaying on the output device in a human-legible format at least one of the following items:
  at least a portion of the event data obtained;
  at least one insight type definition which was utilized while extracting multiple insight instances;
  at least two of the extracted insight instances;
  a name of at least one aggregation function which was utilized while aggregating insight values; or
  at least one of the feature values.

12. The method of claim 9, wherein the method further comprises sending at least the assigned confidence score to the output device over a network connection.

13. The method of claim 9, wherein the method repeats at least the following multiple times: extracting, aggregating, vectorizing, classifying, and assigning, and wherein the method further includes:
  comparing the resulting assigned confidence scores to a predetermined threshold;
  raising an alarm when one of the assigned confidence scores exceeds the predetermined threshold; and
  avoiding raising an alarm when one of the assigned confidence scores does not exceed the predetermined threshold.

14. The method of claim 9, wherein the method performs repetitions in a monitoring system by automatically repeating at least the following multiple times: extracting, aggregating, vectorizing, classifying, and assigning, and wherein the method performs said repetitions at an average rate of at least one repetition per minute over a duration of at least one hundred hours.

15. The method of claim 9, wherein vectorizing creates a feature vector containing one or more feature values corresponding to one or more insight types which represent at least one of the following:
  number of processes created on a machine of the monitored system;
  number of processes created on a machine of the monitored system within a specified time interval;
  number of occurrences of a particular kind of event on one or more machines of the monitored system; or
  number of occurrences of a particular kind of event on one or more machines of the monitored system within a specified time interval.

16. The method of claim 9, wherein the method comprises obtaining digital electronic event data which includes or otherwise identifies at least one of the following:
  digital electronic event data generated by a host-based intrusion detection system;
  digital electronic event data generated by a network-based intrusion detection system;
  digital electronic event data generated by an antivirus tool;
  digital electronic event data generated by a firewall;
  digital electronic event data generated by a motion detector;
  digital electronic event data generated by a storage controller;
  digital electronic event data generated by a cluster controller;
  digital electronic event data generated by a management plane;
  digital electronic event data generated by a mechanism configured to enhance physical security; or
  digital electronic event data generated by a mechanism configured to enhance logical security.

17. The method of claim 9, wherein extracting multiple insight instances from the event data comprises accessing a log or other repository and mapping an alert to at least some of the insight instances.

18. A storage medium configured with code which upon execution by one or more processors performs a confidence scoring method, the method comprising:
  obtaining digital electronic event data which includes or otherwise identifies an alert that was previously generated from a monitor through monitoring of a monitored system;
  extracting multiple insight instances from the event data, each insight instance having an insight value and an insight type;

aggregating insight values of at least two insight instances which have the same insight type, thereby producing an aggregated insight value;

vectorizing insight data by creating a feature vector containing feature values, the feature values corresponding to insight types, the feature vector containing the aggregated insight value as one of the feature values;

classifying the feature vector using a machine learning driven classifier;

assigning at least one confidence score to the alert based on a result of the classifying, each confidence score indicating a degree of confidence that the alert represents a threat to one or more operations of the monitored system; and configuring an output device with a list of alerts ranked according to respective confidence scores;

wherein the method is performed using monitored system data which includes monitored events and which also includes alerts based on monitored events, and wherein alerts are distinguished from monitored events in that some monitored events are not associated with any alert.

19. The storage medium of claim 18, wherein the method is further characterized by at least three of the following listed refinements:

aggregating includes applying at least one of the following aggregation functions: sum, min, max, count, distinct count, mode, mean, or median;

the method comprises applying at least two aggregation functions to a particular set of insight instances, thereby producing at least two different aggregated insight values, and creating and classifying at least two corresponding feature vectors which result in at least two corresponding confidence score assignments for the particular set of insight instances;

the method comprises sending the assigned confidence score to the output device from a cloud service over a network connection;

the method comprises automatically commanding a tool to take a control action to mitigate a security risk to the monitored system;

the method comprises automatically commanding a tool to take a control action to alter accessibility of a computational resource of the monitored system;

the method comprises ranking a plurality of the insight instances according to their respective contributions to the confidence score, and configuring the output device with a list of the ranked insight instances; or extracting multiple insight instances from the event data comprises extracting event data from a log.

20. The storage medium of claim 19, wherein the method is characterized by at least four of the listed refinements.

* * * * *